(12) United States Patent
Marshall et al.

(10) Patent No.: US 10,047,990 B2
(45) Date of Patent: Aug. 14, 2018

(54) REFRIGERATION CIRCUIT CONTROL SYSTEM

(71) Applicant: AAIM CONTROLS, INC., Waynesboro, PA (US)

(72) Inventors: Arthur James Marshall, Gettysburg, PA (US); Randy Lynn Eberly, Greencastle, PA (US)

(73) Assignee: AAIM Controls, Inc., Waynesboro, PA (US)

( * ) Notice: Subject to any disclaimer, the term of this patent is extended or adjusted under 35 U.S.C. 154(b) by 367 days.

(21) Appl. No.: 14/776,977

(22) PCT Filed: Mar. 26, 2014

(86) PCT No.: PCT/US2014/031799
§ 371 (c)(1),
(2) Date: Sep. 15, 2015

(87) PCT Pub. No.: WO2014/160740
PCT Pub. Date: Oct. 2, 2014

(65) Prior Publication Data
US 2016/0025396 A1    Jan. 28, 2016

Related U.S. Application Data

(60) Provisional application No. 61/805,488, filed on Mar. 26, 2013.

(51) Int. Cl.
*F25B 49/02* (2006.01)
*F25B 41/06* (2006.01)

(52) U.S. Cl.
CPC ............. *F25B 49/02* (2013.01); *F25B 41/062* (2013.01); *F25B 2500/01* (2013.01); *F25B 2600/2513* (2013.01); *F25B 2700/00* (2013.01); *F25B 2700/2117* (2013.01); *F25B 2700/21175* (2013.01)

(58) Field of Classification Search
CPC .................. F25B 49/02; F25B 2500/01; F25B 2700/21175; F25B 2007/2117; F25B 2600/2513; F25B 2700/00
See application file for complete search history.

(56) References Cited

U.S. PATENT DOCUMENTS

| | | |
|---|---|---|
| 2,496,558 A | 2/1950 | Lawrence |
| 3,390,540 A | 7/1968 | Brush |
| 3,677,028 A | 7/1972 | Glendon |
| 3,744,301 A | 7/1973 | Arave |

(Continued)

FOREIGN PATENT DOCUMENTS

| | | |
|---|---|---|
| DE | 102010001024 A1 | 7/2011 |
| EP | 0148102 | 7/1985 |

OTHER PUBLICATIONS

International Search Report in corresponding PCT/US14/031799, USPTO, 15 pages.

*Primary Examiner* — Kun Kai Ma
(74) *Attorney, Agent, or Firm* — Hooker & Habib, P.C.

(57) ABSTRACT

A control system for a refrigeration circuit having one or more working fluid refrigerant sensors capable of measuring the fluid energy value of the refrigerant along a low side of the refrigeration circuit and regulating the flow of refrigerant to the circuit low side through reference to expected refrigerant fluid energy values.

24 Claims, 13 Drawing Sheets

(56) References Cited

U.S. PATENT DOCUMENTS

| | | | |
|---|---|---|---|
| 3,977,205 A | 8/1976 | Dreisziger et al. | |
| 4,089,368 A | 5/1978 | Bell, Jr. et al. | |
| 4,373,353 A | 2/1983 | Anzalone | |
| 4,478,051 A | 10/1984 | Ibrahim | |
| 4,499,739 A | 2/1985 | Matsuoka et al. | |
| 4,523,435 A | 6/1985 | Lord | |
| 4,527,399 A | 6/1985 | Lord | |
| 4,563,879 A | 1/1986 | Hama et al. | |
| 4,577,468 A | 3/1986 | Nunn et al. | |
| 4,586,828 A * | 5/1986 | Winter | F25B 41/062 374/15 |
| 4,596,123 A | 6/1986 | Cooperman | |
| 4,616,484 A | 10/1986 | Mehdi et al. | |
| 4,621,502 A | 11/1986 | Ibrahim et al. | |
| 4,665,716 A | 5/1987 | Cochran | |
| 4,794,762 A | 1/1989 | Orth et al. | |
| 4,848,099 A * | 7/1989 | Beckey | F25B 41/062 236/78 D |
| 4,907,417 A | 3/1990 | Forsythe | |
| 5,193,353 A | 3/1993 | Brendel et al. | |
| 5,216,892 A | 6/1993 | Jarosch et al. | |
| 5,228,308 A | 7/1993 | Day et al. | |
| 5,231,841 A | 8/1993 | McClelland et al. | |
| 5,392,612 A | 2/1995 | Alsenz | |
| 5,428,966 A | 7/1995 | Alsenz | |
| 5,628,200 A | 5/1997 | Pendergrass | |
| 5,711,161 A | 1/1998 | Gustafson | |
| 5,743,097 A | 4/1998 | Frank | |
| 5,806,324 A | 9/1998 | Shaw | |
| 5,877,476 A | 3/1999 | Yabuki et al. | |
| 5,904,049 A | 5/1999 | Jaster et al. | |
| 5,927,093 A | 7/1999 | Noguchi et al. | |
| 5,963,198 A | 10/1999 | Husarik | |
| 6,141,980 A | 11/2000 | Shaw | |
| 6,164,081 A * | 12/2000 | Jensen | F25B 41/062 236/92 B |
| 6,260,368 B1 | 7/2001 | Redlich | |
| 6,951,116 B2 | 10/2005 | Lee et al. | |
| 7,228,706 B1 | 6/2007 | Xu | |
| 7,290,402 B1 * | 11/2007 | Bailey | F25B 41/062 236/92 B |
| 7,694,529 B2 | 4/2010 | Oshitani et al. | |
| 8,096,141 B2 | 1/2012 | VanderZee | |
| 8,136,368 B2 | 3/2012 | Reich et al. | |
| 8,646,286 B2 | 2/2014 | Scherer et al. | |
| 9,459,029 B2 * | 10/2016 | Ogawa | F25B 41/04 |
| 2004/0244405 A1 | 12/2004 | Kim et al. | |
| 2006/0162538 A1 | 7/2006 | VanderZee | |
| 2007/0175229 A1 * | 8/2007 | Redlich | F25B 41/062 62/225 |
| 2008/0098757 A1 | 5/2008 | Takeuchi et al. | |
| 2008/0105420 A1 | 5/2008 | Taras et al. | |
| 2008/0134699 A1 | 6/2008 | Leaver et al. | |
| 2008/0315000 A1 * | 12/2008 | Gorthala | B60H 1/00785 236/46 C |
| 2009/0173088 A1 | 7/2009 | Su et al. | |
| 2009/0301112 A1 | 12/2009 | Nelson | |
| 2010/0083691 A1 | 4/2010 | Immink et al. | |
| 2010/0324742 A1 * | 12/2010 | Huerta-Ochoa | F25B 41/062 700/282 |
| 2011/0079032 A1 | 4/2011 | Taras et al. | |
| 2011/0209485 A1 * | 9/2011 | Lifson | F25B 49/02 62/115 |
| 2012/0042669 A1 | 2/2012 | Minor et al. | |
| 2012/0247138 A1 * | 10/2012 | Senf, Jr. | F25B 49/02 62/191 |
| 2012/0260679 A1 * | 10/2012 | Huerta-Ochoa | F25B 41/062 62/56 |
| 2013/0086930 A1 * | 4/2013 | Scherer | F25B 49/02 62/115 |
| 2013/0174591 A1 * | 7/2013 | Das | F25B 49/02 62/115 |
| 2013/0291568 A1 * | 11/2013 | Elstroem | F25B 41/062 62/56 |
| 2015/0052922 A1 * | 2/2015 | Tanaka | F25B 49/02 62/210 |

* cited by examiner

REFRIGERATION CIRCUIT CONTROL SYSTEM

FIELD OF THE DISCLOSURE

The disclosure relates to the field of control systems for vapor-compression refrigeration circuits having a compressor, condenser and evaporator and more particularly to control systems for monitoring and controlling direct expansion (DX) evaporator refrigeration circuits.

BACKGROUND OF THE DISCLOSURE

Vapor-compression refrigeration circuits for circulating a working fluid refrigerant having a low side comprising an evaporator and a high side comprising a compressor and condenser are well-known.

Refrigerant in a liquid state is metered to the low side of the refrigeration circuit by a metering control throttle valve. As the refrigerant flows through the low side evaporator, evaporator outlet line and other low side lines to the compressor, the refrigerant absorbs heat energy from the ambient environment. Heat energy absorbed by the refrigerant allows cooling of a desired space. As the refrigerant absorbs heat energy, it transforms from a liquid to a saturated liquid/vapor and finally to a superheated vapor state.

Superheated refrigerant vapor enters the high side of the refrigeration circuit at the compressor. The compressor compresses the vapor refrigerant into a high-pressure, superheated vapor, whereupon the refrigerant is flowed to the condenser. The condenser allows the refrigerant to reject heat energy to an ambient heat sink whereupon the refrigerant reverts to a liquid and is flowed back to the control valve and evaporator. The process is repeated through the refrigeration circuit to meet desired cooling loads.

Refrigeration circuits are designed to allow refrigerant to reach a set degree of superheat before refrigerant enters the compressor from the low side. This is done because at 0 degrees of superheat, the refrigerant is in a saturated liquid/vapor state as a mixture of saturated vapor and liquid. Compressors are designed to compress only refrigerant gas and can be damaged if liquid refrigerant enters the compressor. Often, refrigeration circuits are designed to allow refrigerant to reach a minimum set degree of superheat of about 10° F. is used to assure that the saturated liquid/vapor refrigerant has fully converted into a vapor before compression.

While configuring a refrigeration circuit to generate a set degree of superheat in refrigerant may be sufficient in steady-state cooling conditions, when evaporators are placed under variable cooling load conditions, operation errors can occur. Variable cooling load conditions cause rapid refrigerant vaporization and overfeeding conditions that require large superheat settings to assure all refrigerant is in a vapor state before exiting the evaporator. This necessitates setting a superheat setting. For instance, in DX evaporator industrial refrigeration applications, a superheat of 20° F. or higher may be used.

Large superheat settings significantly reduce refrigeration circuit efficiency and require refrigeration circuits to flow large quantities of refrigerant. A common refrigerant used in direct expansion evaporator applications is ammonia (NH3). While ammonia provides desired heat transferring properties, its use in large scale refrigerant applications presents risks including toxic inhalation, fire and explosion if there are refrigeration circuit or storage tank leaks.

Evaluating refrigerant status through the low side of the refrigeration circuit is important in developing efficient refrigeration circuits.

It is known to evaluate low side refrigerant status by placing a superheat sensor at the evaporator outlet line. The superheat sensor includes a temperature sensor and vapor pressure sensor to calculate the degree of superheat in vaporized refrigerant flowing by the sensor. If the detected amount of superheat in the fluid flow does not correspond with a set minimum desired superheat value, an alarm signal is sent to an electronic control system. The control system will then actuate the control throttle valve to reduce the flow of refrigerant entering the circuit low side.

It is also known to evaluate low side refrigerant status by placing a capacitive sensor at the evaporator outlet line. Capacitive sensors are commonly known as void fraction or quality sensors and provide a direct reading of the actual ratio of liquid present in a refrigeration circuit.

As void fraction sensors can only detect quantities of liquid refrigerant present within the circuit they are unable to detect refrigerant superheat. A void fraction sensor's output is directly proportional to the percentage of measured liquid state refrigerant flowing through the sensor. In such systems, the refrigeration circuit is configured so that refrigerant flowing from evaporator and through the evaporator outlet line is in a saturated liquid/vapor state containing a low percentage of liquid state refrigerant. If the detected amount of liquid refrigerant is above a set maximum desired value, an alarm signal is sent to an electronic control system. The control system will then actuate the control throttle valve to reduce the flow of refrigerant entering the circuit low side.

Such a system is described in U.S. Patent Publication number US20130291568 A1. The publication further describes a refrigeration circuit including a second void fraction sensor immediately upstream of the compressor. The second void fraction sensor acts as a safety for the compressor, sending a shutdown or speed reduction signal to the compressor when liquid state refrigerant is detected.

A limitation with evaluating low side refrigerant status with a void fraction sensor is that in any case of a refrigerant being at 0 degrees of superheat or above, the void fraction sensor's output remains null. This leads to potential system inefficiently and malfunction, especially in changing transient cooling load conditions.

Another limitation with the above described refrigeration circuit control systems is that the superheat and void fraction sensors provide control feedback based on set superheat or liquid state refrigerant percentage values at the exit of an evaporator. In variable cooling load conditions, feedback from a single sensor too slow to allow the system to properly meter control valve refrigerant flow to the low side. This problem is heightened by sensors being installed downstream from the system evaporator. The evaporator provides the highest rate of heat exchange for the low side of the refrigeration circuit and may contain hundreds of feet of line through which a metered working fluid must flow before the sensor is reached and a change in system status is detected. By the time the void-fraction sensor provides an indication to the control system that refrigerant liquid content is too high or too low and corresponding valve actuation signals can be sent to the far upstream metering valve, it is too late to provide appropriate control of evaporator-downstream refrigerant vapor content.

In the case of too little refrigerant flow, this results in premature refrigerant over boiling within the evaporator, which decreases evaporator efficiency. In the case of too much refrigerant flow, this allows liquid refrigerant to exit the evaporator, necessitating additional system components such as liquid traps to protect the compressor. This adds to system installation costs and likewise lowers system efficiency.

Therefore there is a need for a refrigeration circuit control system that detects refrigerant state conditions and controls the circuit to increase efficiently and to reduce the quantity of working fluid needed to meet cooling load conditions, especially under transient cooling loads.

BRIEF SUMMARY OF THE DISCLOSURE

Disclosed is a refrigeration circuit control system that detects refrigerant state conditions and controls the circuit to increase efficiently and to regulate the quantity of working fluid needed to meet cooling load conditions, especially under transient cooling loads.

The system detects the amount of heat energy absorbed by refrigerant as it flows through the refrigeration circuit low side from the control throttle valve to the compressor. The system then compares the detected value to expected ideal refrigerant heat energy values for the refrigeration circuit low side. If there are discrepancies between the detected and expected values, the system actuates the metering control throttle valve to adjust refrigerant flow to the low side accordingly.

Heat energy absorbed by refrigerant flowing through the low side is indicated by the quantity of liquid refrigerant in saturated liquid/vapor state refrigerant as detected by a void fraction sensor or by the refrigerant degree of superheat by a superheat sensor.

The expected ideal refrigerant heat energy values for the refrigeration circuit low side are based on the heat transfer capacity of the low side line components and the rate of refrigerant flow through the low side line. In certain embodiments, the system accounts for the heat transfer capacity of the evaporator and the evaporator outlet line leading from the evaporator to the compressor individually to determine refrigerant state conditions and control the refrigeration circuit.

The refrigeration circuit control system uses one or more low side sensors to detect the amount of heat energy absorbed by refrigerant at different points along the low side circuit. The sensors report refrigerant conditions to a controller unit which in turn meters the flow of refrigerant into the refrigeration circuit low side by actuation of a control throttle valve.

The system takes into account the differing heat transfer capacities of different circuit low side components to provide improved system control. Different circuit low side components have different heat transfer capacities to allow heat energy exchange between the ambient environment and refrigerant flowing through the component. Particularly, while the evaporator has the highest heat transfer capacity to provide heat energy to circuit refrigerant, the evaporator-to-compressor line, leading from the evaporator to the compressor also provides meaningful heat energy to the refrigerant.

In certain embodiments, the system may include one or more void-fraction sensors installed at different locations along the length of the evaporator coil line. During circuit operation, the control system detects the amount of heat energy absorbed by saturated refrigerant as indicated by the amount of liquid refrigerant present along the length of the evaporator coil. These detected values are compared to desired, idealized refrigerant liquid/vapor state conditions corresponding to heat transfer capacity of the evaporator coil along its length. When there are discrepancies between the monitored refrigerant liquid/vapor state and the idealized refrigerant liquid/vapor state, the system adjusts the refrigerant input at the control valve to correct for the discrepancies.

An advantage of installing a void-fraction sensor within the evaporator coil is that it allows the system to detect refrigerant liquid/vapor state discrepancies much earlier in the low side circuit line refrigerant flow path than installation of a sensor downstream of the evaporator coil. This allows for greatly improved system response times in controlling refrigerant flow to the evaporator.

In other embodiments, the system may include at least one void-fraction sensor installed within the evaporator coil and another void-fraction sensor or superheat sensor installed within the evaporator-to-compressor line. During circuit operation, the control system monitors the amount of heat energy absorbed by refrigerant along the length of the evaporator coil and though the evaporator-to-compressor line and compares monitored values to desired, idealized refrigerant states. When there are discrepancies between the monitored state and the desired, idealized state, the system adjusts refrigerant input at the control valve to correct for the discrepancies.

In yet further embodiments, the system may use two sensors and adjust sensor set points for improved low side circuit performance. In such embodiments, when a first sensor located downstream of a second sensor detects an undesired refrigerant heat energy state, the first sensor provides a feedback signal to the system. The system responds by actuating the control valve appropriately and by adjusting the set point of the upstream second sensor to an appropriate level to obtain desired refrigerant heat energy state at the downstream location. In related embodiments, the system may adjust the set points for additional sensors located in the low side.

Additional embodiments and features will become evident as the description proceeds, especially when taken in conjunction with the accompanying drawing sheets.

DETAILED DESCRIPTION

Figure 1:
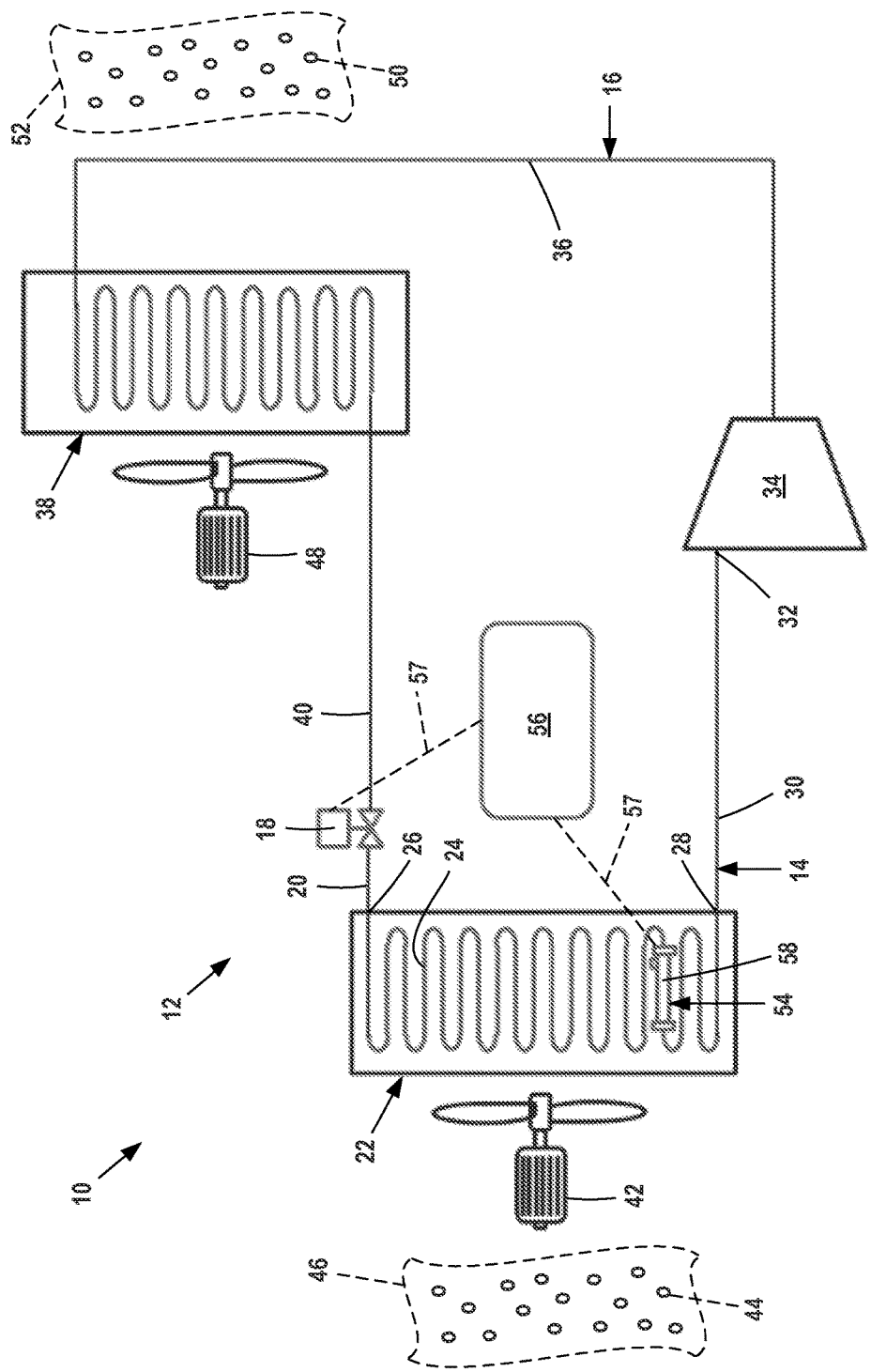
FIG. 1 is a view of the control system within a refrigeration circuit.

FIG. 1 is a representational view of a control system 10 for monitoring and controlling a refrigeration circuit 12.

Refrigeration circuit 12 includes circuit low pressure side or low side 14 and circuit high pressure side or high side 16.

Low side 14 and high side 16 are each made up of fluid lines and circuit components that circulate a working fluid refrigerant (not illustrated) during operation of refrigeration circuit 12.

Low side 14 extends from metering control valve 18 through evaporator input line 20 and through evaporator 22. Evaporator line 24 extends from evaporator inlet 26 to evaporator outlet 28. Low side 14 continues through evaporator output line 30 and ends at compressor inlet 32.

Metering control valve 18 may be a motorized expansion valve or like valve. Valve 18 is capable of being actuated electronically by a controller from a closed state to a desired degree of openness in order to control refrigerant flow through the valve at a desired refrigerant flow rate.

High side 16 extends from compressor 34 through compressor outlet line 36, through condenser 38 to condenser output line 40 and back to metering control valve 18 to complete refrigeration circuit 12.

Evaporator fan 42 may be used with the system to flow heat energy 44 from an ambient environment source 46 through air to evaporator 22 and refrigerant flowing through evaporator line 24.

Likewise, condenser fan 48 may be used with the system to extract heat energy 50 from refrigerant flowing through condenser 38 to ambient environment 52.

Application figures showing refrigeration circuits are representational and not to scale. In real world applications, evaporator 22 and condenser 38 may be much larger than the rest of the system. Particularly, evaporator line 24 may extend for many times the length of other system components. Evaporator output line 30 may extend a great length from evaporator 22 to compressor 34 depending on the specific configuration of the circuit.

Refrigeration circuit 12 further includes at least one working fluid refrigerant sensor 54 electronically joined to controller 56. Controller 56 is likewise joined to control valve 18. Lines 57 join controller 56 to sensor 54 and valve 18. Lines 57 may be hard wired lines or wireless signals.

Controller 56 may include a proportional-integral-derivative controller or PID controller. The PID controller allows control system 10 to use of control loop feedback cycles based on data received from one or more system working fluid refrigerant sensors 54. In particular, the PID controller allows controller 56 to detect the difference between sensor 54 data collected along low side 14 and desired, ideal sensor data expected from sensors 54 during operation of circuit 12. Controller 56 attempts to minimize the difference by actuating control valve 18 to control the flow of refrigerant into low side 14.

The desired, ideal sensor data expected from sensors 54 during operation of circuit 12 may be implemented as a sensor set point for each system sensor 54.

Working fluid refrigerant sensor 54 is adapted to measure physical qualities of refrigerant passing through different points of low side 14. Physical qualities measured by sensor 54 are indicative of heat energy 44 absorbed from the ambient environment 46 by refrigerant passing through low side 14.

For example, in certain systems embodiments, a fluid refrigerant sensor 54 may be a void fraction sensor adapted to detect the percentage of liquid in refrigerant in a saturated liquid/vapor state at locations along low side 14. A lower detected percentage of liquid refrigerant indicates a higher percentage of vapor refrigerant within the working fluid. Thus, void fraction sensor signals transmitted to controller regarding the ratio of liquid to vapor state within refrigerant at a location along low side 14 indicates to the controller the amount of heat energy absorbed by refrigerant at low side locations.

In other systems embodiments, a fluid refrigerant sensor 54 may be a superheat sensor having temperature and pressure sensors to monitor the degree of superheat in vapor state refrigerant at locations along low side 14. A higher degree of refrigerant superheat indicates a higher amount of heat energy absorbed by refrigerant.

In further systems embodiments of control system 10, refrigeration circuit 12 may have two or more fluid refrigerant sensors 54 including at least one void fraction sensor and at least one superheat sensor as disclosed in greater detail below.

As illustrated in FIG. 1, fluid refrigerant sensor 54 is a void fraction sensor 58 located within evaporator 24 along the length of evaporator line 24.

Figure 2:
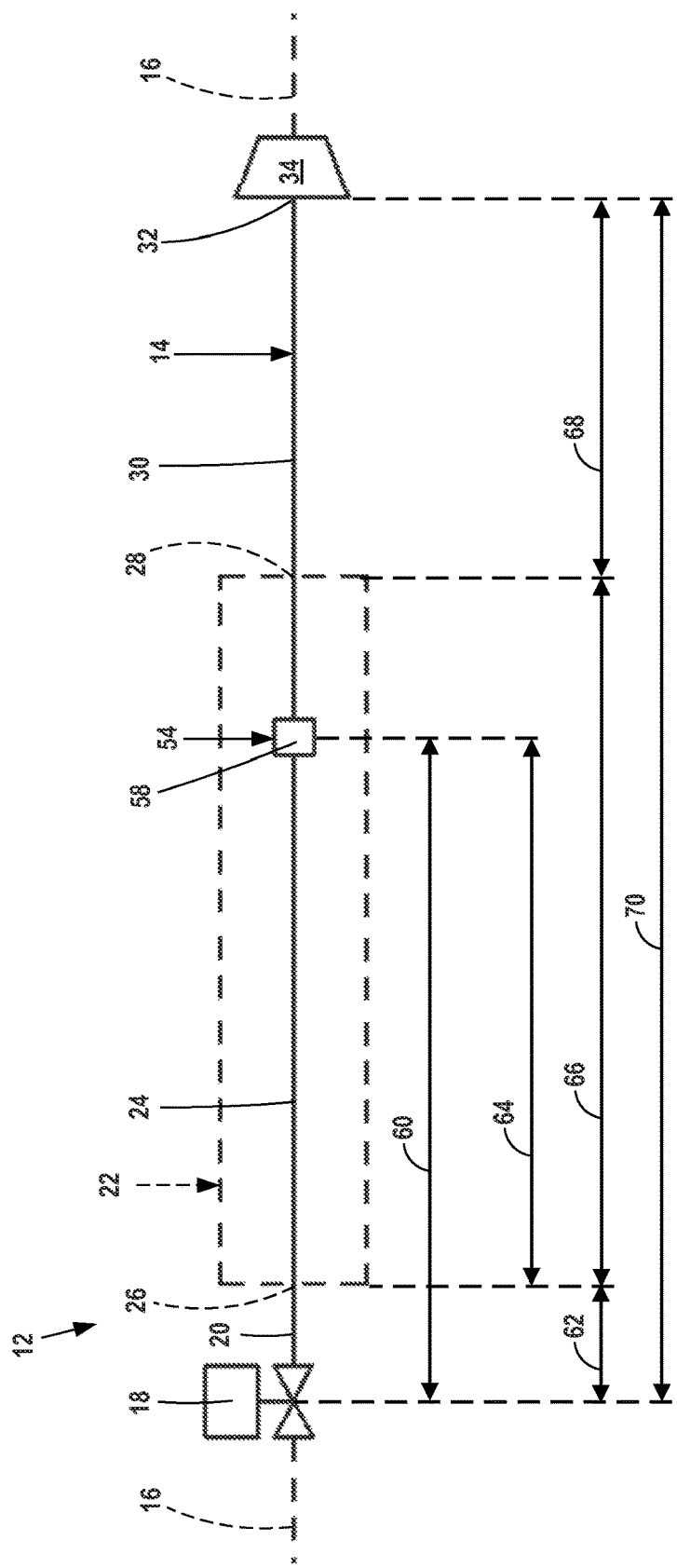
FIG. 2 is a representational view of the FIG. 1 refrigeration circuit low side line.

FIG. 2 is a representational diagram of FIG. 1 low side 14, illustrating low side fluid lines and circuit components in a linear format.

Void fraction sensor 58 is located in low side 14 a distance 60 from control valve 18. Distance 60 encompasses line distance 62 along evaporator input line 20 and a percentage distance 64 of evaporator line 24 line distance 66.

Evaporator output line 30 has a line distance 68. Low side 14 total line distance 70 is made up of line distances 62, 66 and 68.

The different fluid lines and circuit components of low side 14 have different heat transfer coefficients along line distances 62, 66 and 68. The differing heat transfer coefficients along line distances 62, 66 and 68 allow different rates of heat transfer between refrigerant in the line and heat energy 44 from the ambient environment 46.

As control valve 18 is normally installed closely to evaporator inlet 26, evaporator input line 20 tends to be a short distance. Additionally, evaporator input line 20 is conventionally well-insulated to prevent refrigerant heat gain before reaching evaporator 22. For these reasons, the heat transfer coefficient between the environment and refrigerant traveling through line distance 62 is considered negligible.

Evaporator 22 is designed to flow heat energy to refrigerant traveling through evaporator line 24. The heat transfer coefficient between the environment and refrigerant traveling through line distance 66 is high to meet circuit requirements to transform liquid refrigerant to a saturated liquid/ vapor state. There is a generally proportional relationship between the distance that a refrigerant travels through evaporator line 24 and the amount of heat energy absorbed by the refrigerant from the environment.

Likewise refrigerant flowing through evaporator output line 30 absorbs additional heat energy from the ambient environment. While overall heat transfer coefficient along line distance 68 is not as great as through line distance 66, it is significant to system functioning to assure refrigerant vapor obtains a desired degree of superheat before reaching compressor 34. There is likewise a generally proportional relationship between the distance that a refrigerant travels through evaporator output line 30 and the amount of heat energy absorbed by the refrigerant from the environment even though the heat transfer coefficient for line distance 68 is lower than that of line distance 66.

Figure 3:
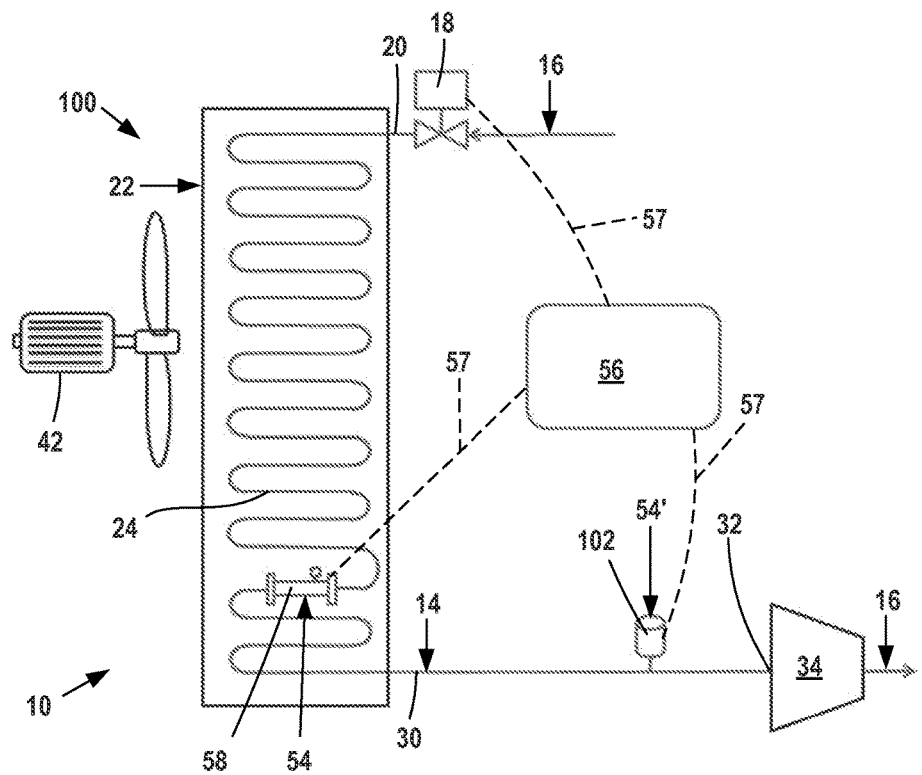
FIG. 3 is a view of the control system within an alternate embodiment refrigeration circuit low side.

FIG. 3 is a representational view of control system 10 for monitoring and controlling a refrigeration circuit 100.

Refrigeration circuit 100 is similar to refrigeration circuit 12, having low side 14 extending from valve metering control valve 18 to compressor inlet 32.

Refrigeration circuit 100 further includes a second working fluid refrigerant sensor 54' located within evaporator output line 30. As illustrated in FIG. 3, working fluid refrigerant sensor 54' is a superheat sensor 102 located along evaporator output line 24 along the length of evaporator line 30.

Figure 4:
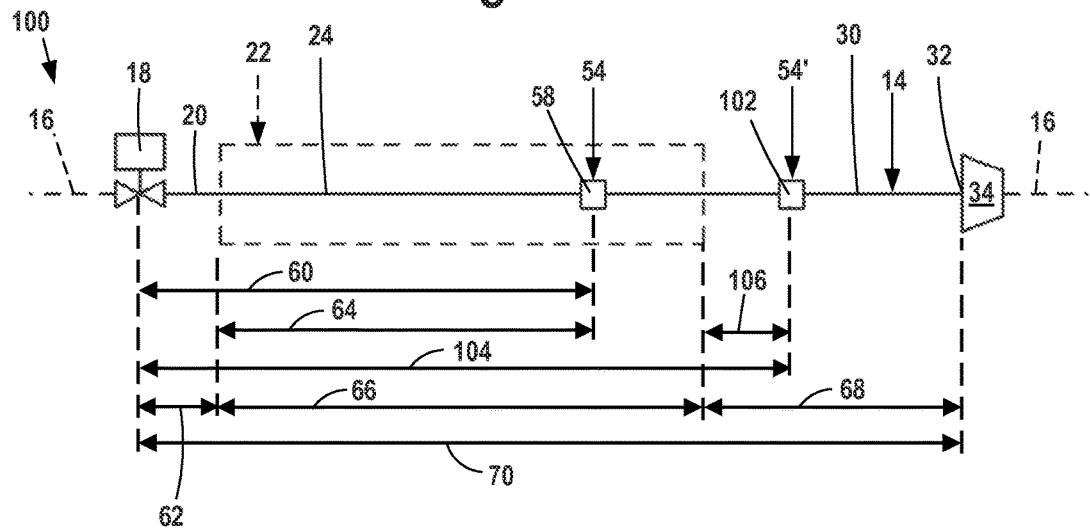
FIG. 4 is a representational view of the FIG. 3 low side line.

FIG. 4 is a representational diagram of refrigeration circuit 100 low side 14.

FIG. 4 is similar to FIG. 2 and includes superheat sensor 102 located in evaporator output line 30. Superheat sensor 102 is located in low side 14 a distance 104 from control valve 18. Distance 104 encompasses line distance 62 along evaporator input line 20, distance 66 of evaporator line 24 and a percentage of line distance 106 of line distance 68 along evaporator output line 30.

Distance 104 is shown as greater than distance 60. This is indicative that under steady state circuit operating conditions, refrigerant that has traveled distance 104 at sensor 54' has absorbed a greater amount of heat energy than refrigerant that has only traveled distance 60 to sensor 54.

Figure 5:
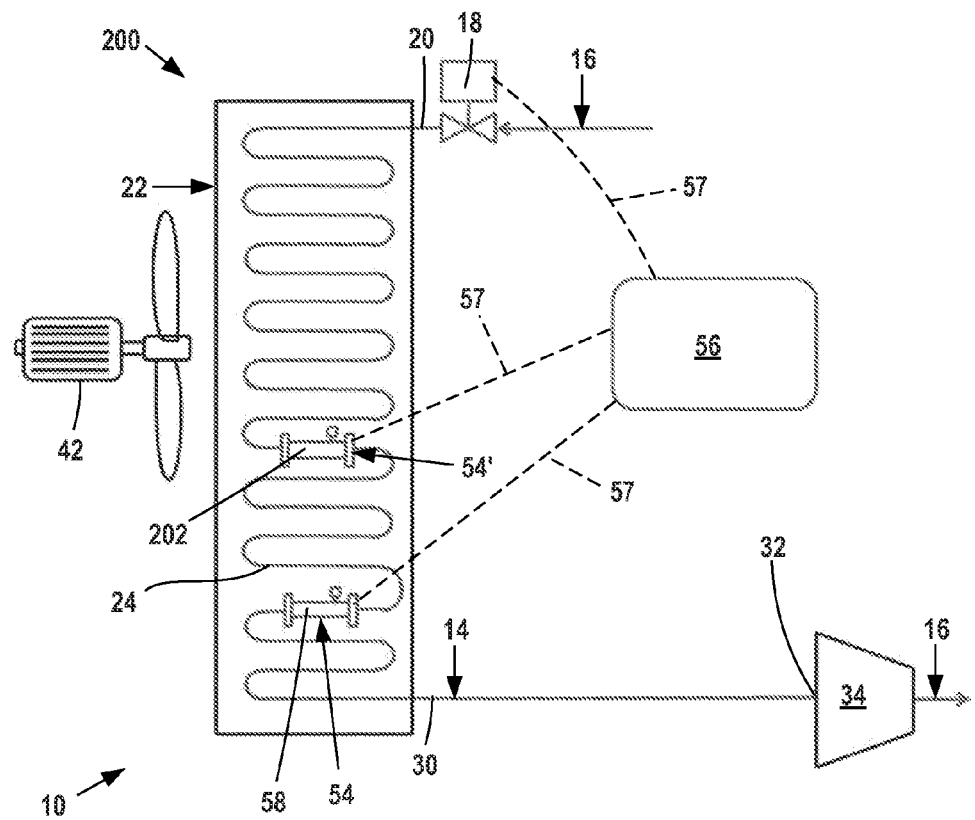
FIG. 5 is a view of the control system within an alternate embodiment refrigeration circuit low side.

FIG. 5 is a representational view of control system 10 for monitoring and controlling a refrigeration circuit 200.

Refrigeration circuit 200 is similar to refrigeration circuit 12, having low side 14 extending from valve metering control valve 18 to compressor inlet 32.

Refrigeration circuit 200 includes a second working fluid refrigerant sensor 54' located within evaporator output line upstream of refrigerant sensor 54. As illustrated in FIG. 5, fluid refrigerant sensor 54' is a void fraction sensor 202.

Figure 6:
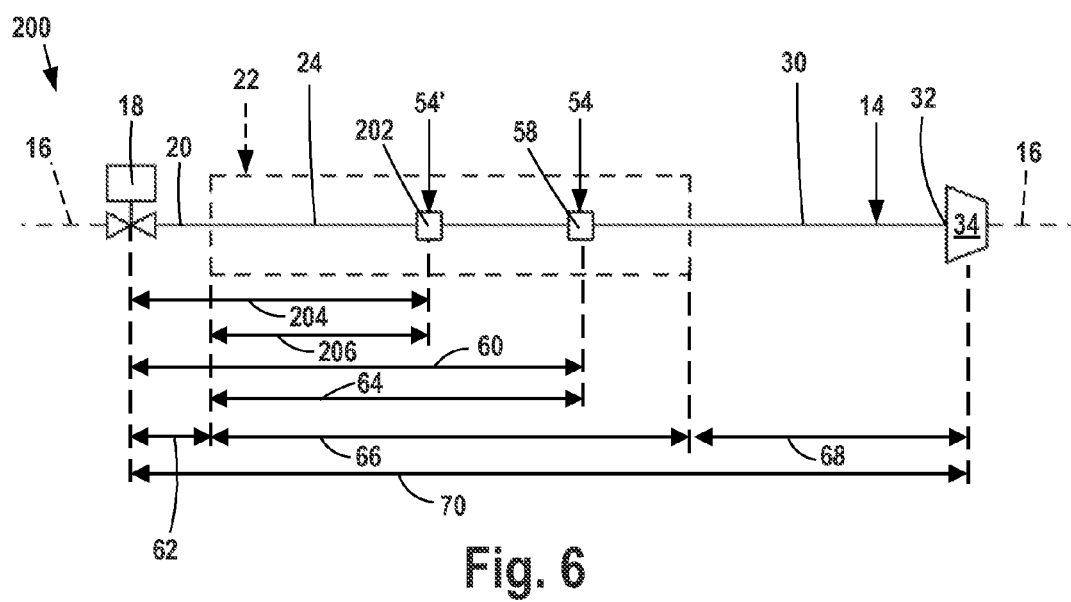
FIG. 6 is a representational view of the FIG. 5 low side line.

FIG. 6 is a representational diagram of refrigeration circuit 200 low side 14.

FIG. 6 is similar to FIG. 2 and includes void fraction sensor 202 located in evaporator output line 30. Void fraction sensor 202 is located in low side 14 a distance 204 from control valve 18. Distance 204 encompasses line distance 62 and a percentage of line distance 206 of evaporator line 24. Distance 204 is less than distance 60.

Figure 7:
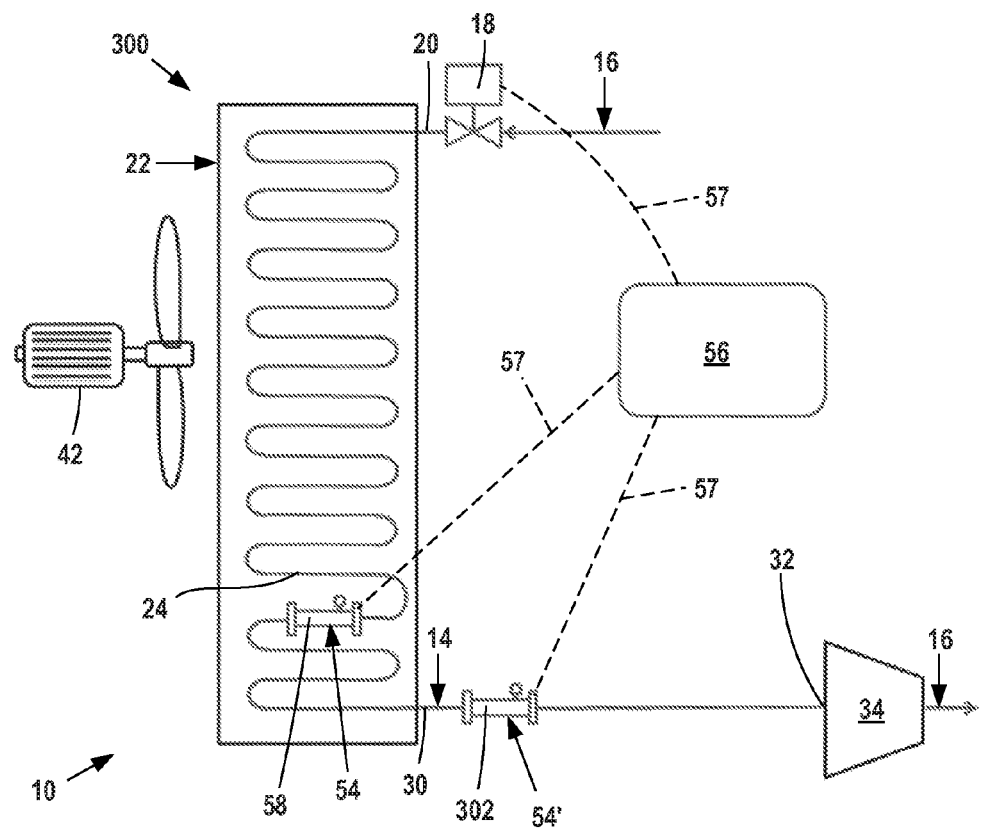
FIG. 7 is a view of the control system within an alternate embodiment refrigeration circuit low side.

FIG. 7 is a representational view of control system 10 for monitoring and controlling a refrigeration circuit 300.

Refrigeration circuit 300 is substantially similar to refrigeration circuit 12, having low side 14 extending from valve metering control valve 18 to compressor inlet 32. Refrigeration circuit 300 includes a second working fluid refrigerant sensor 54' located within evaporator output line 30. As illustrated in FIG. 7, working fluid refrigerant sensor 54' is a void fraction sensor 302.

Figure 8:
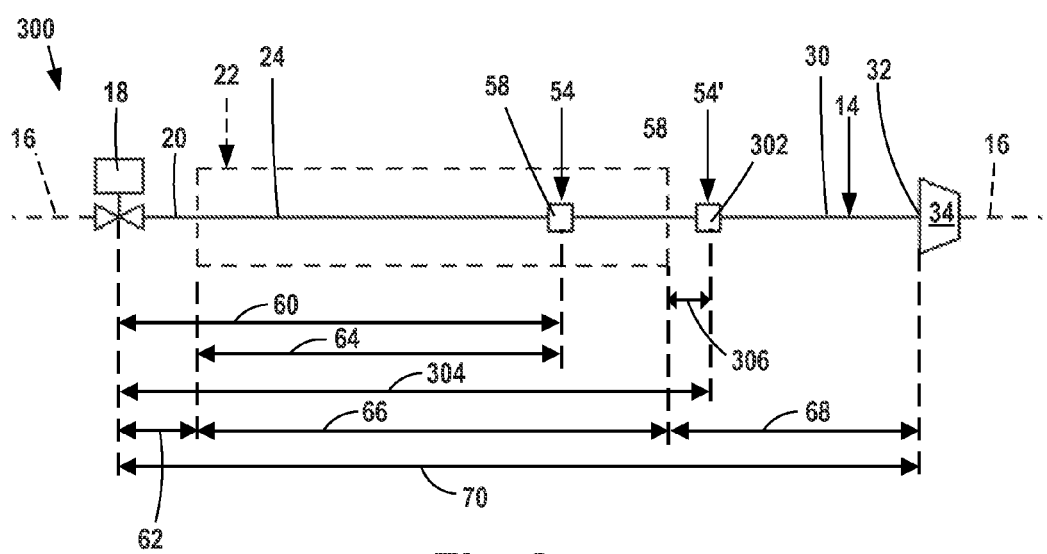
FIG. 8 is a representational view of the FIG. 7 low side line.

FIG. 8 is a representational diagram of refrigeration circuit 300 low side 14.

FIG. 8 is similar to FIG. 2 and includes void fraction sensor 302 located in evaporator output line 30. Void fraction sensor 302 is located in low side 14 a distance 304 from control valve 18. Distance 304 encompasses line distance 62, line distance 66 and a percentage line distance 306 of line distance 68. Distance 304 is greater than distance 60.

Figure 9:
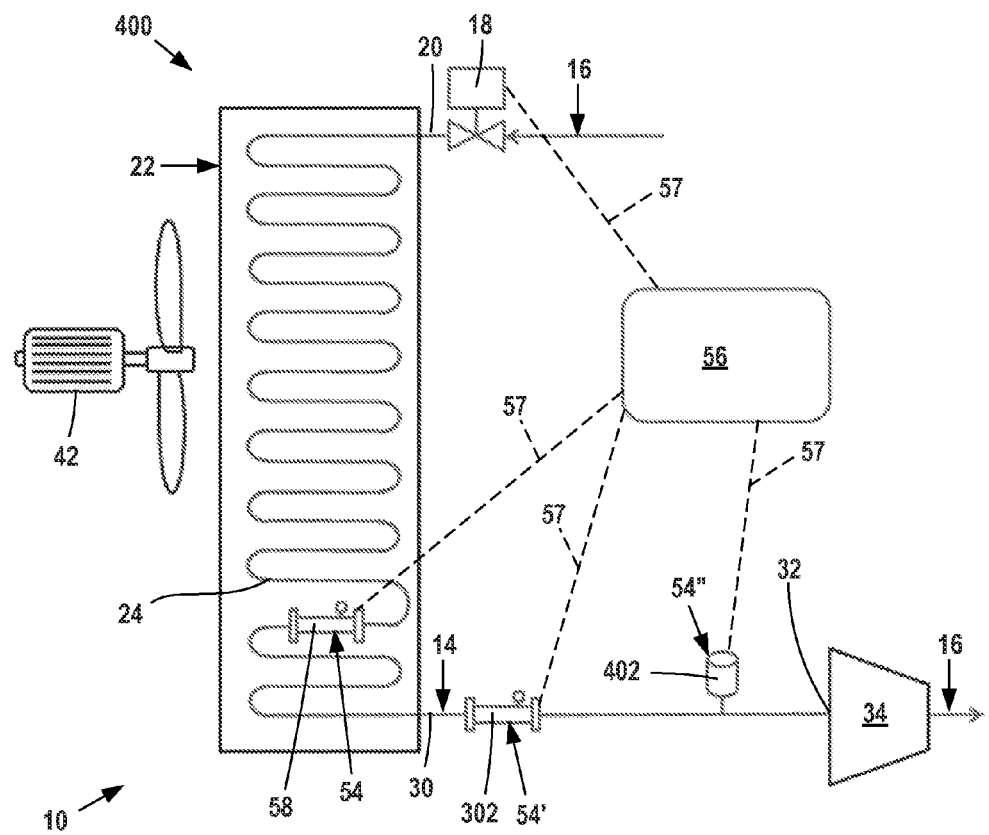
FIG. 9 is a view of the control system within an alternate embodiment refrigeration circuit low side.

FIG. 9 is a representational view of control system 10 for monitoring and controlling a refrigeration circuit 400.

Refrigeration circuit 400 is similar to refrigeration circuit 300 disclosed above but including a third working fluid refrigerant sensor 54" located within evaporator output line 30 and downstream from void fraction sensor 302. As illustrated in FIG. 9, working fluid refrigerant sensor 54" is a superheat sensor 402.

Figure 10:
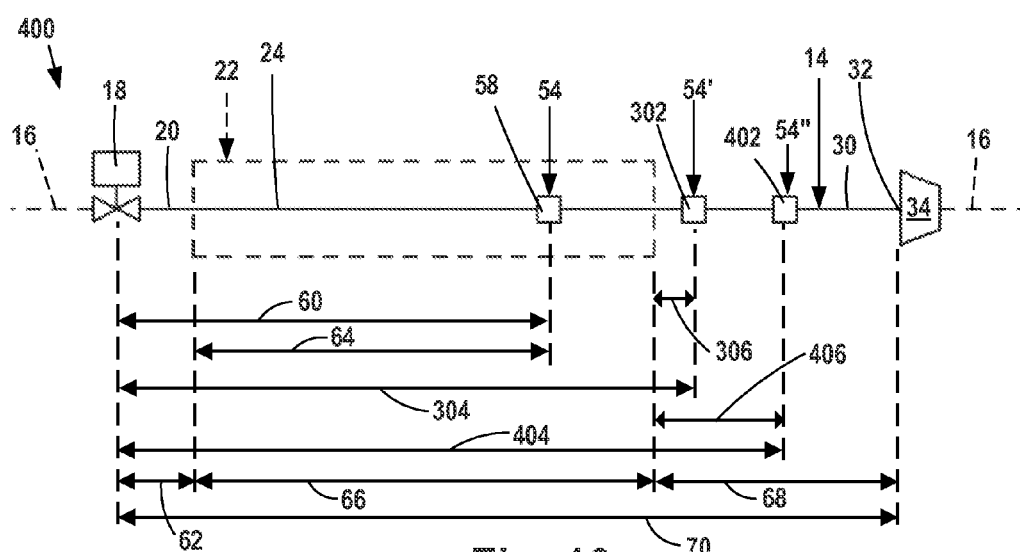
FIG. 10 is a representational view of the FIG. 9 low side line.

FIG. 10 is a representational diagram of refrigeration circuit 400 low side 14.

FIG. 10 is similar to FIG. 8 and includes superheat sensor 402 located in evaporator output line 30. Superheat sensor 402 is located in low side 14 a distance 404 from control valve 18. Distance 404 encompasses line distance 62, line distance 66 and a percentage line distance 406 of line distance 68. Distance 404 is greater than distances 60 and 304.

Figure 11:
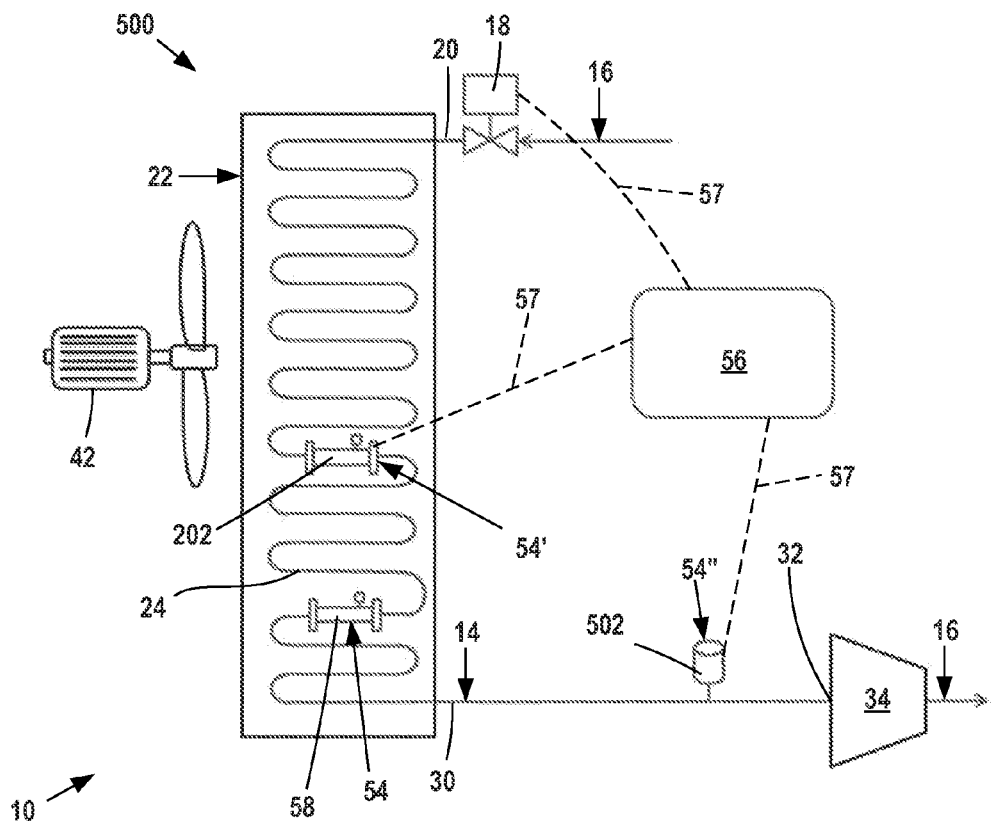
FIG. 11 is a view of the control system within an alternate embodiment refrigeration circuit low side.

FIG. 11 is a representational view of control system 10 for monitoring and controlling a refrigeration circuit 500.

Refrigeration circuit 500 is similar to refrigeration circuit 200 disclosed above but including a third working fluid refrigerant sensor 54" located within evaporator output line 30. As illustrated in FIG. 11, working fluid refrigerant sensor 54" is a superheat sensor 502.

Figure 12:
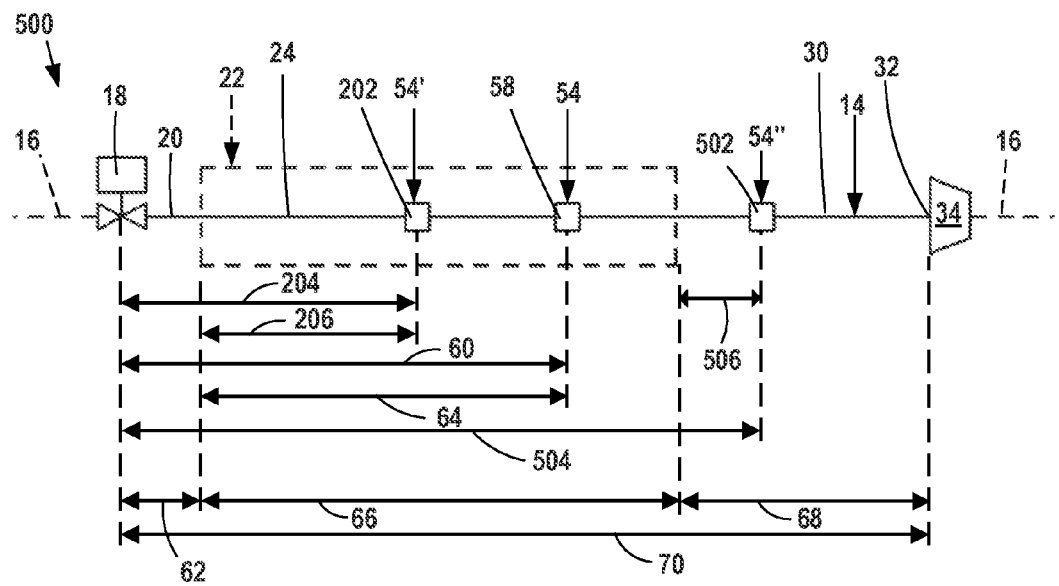
FIG. 12 is a representational view of the FIG. 11 low side line.

FIG. 12 is a representational diagram of refrigeration circuit 500 low side 14.

FIG. 12 is similar to FIG. 6 and includes superheat sensor 502 located in evaporator output line 30. Superheat sensor 502 is located in low side 14 a distance 504 from control valve 18. Distance 504 encompasses line distance 62, line distance 66 and a percentage line distance 506 of line distance 68. Distance 504 is greater than distances 60 and 204.

Figure 13:
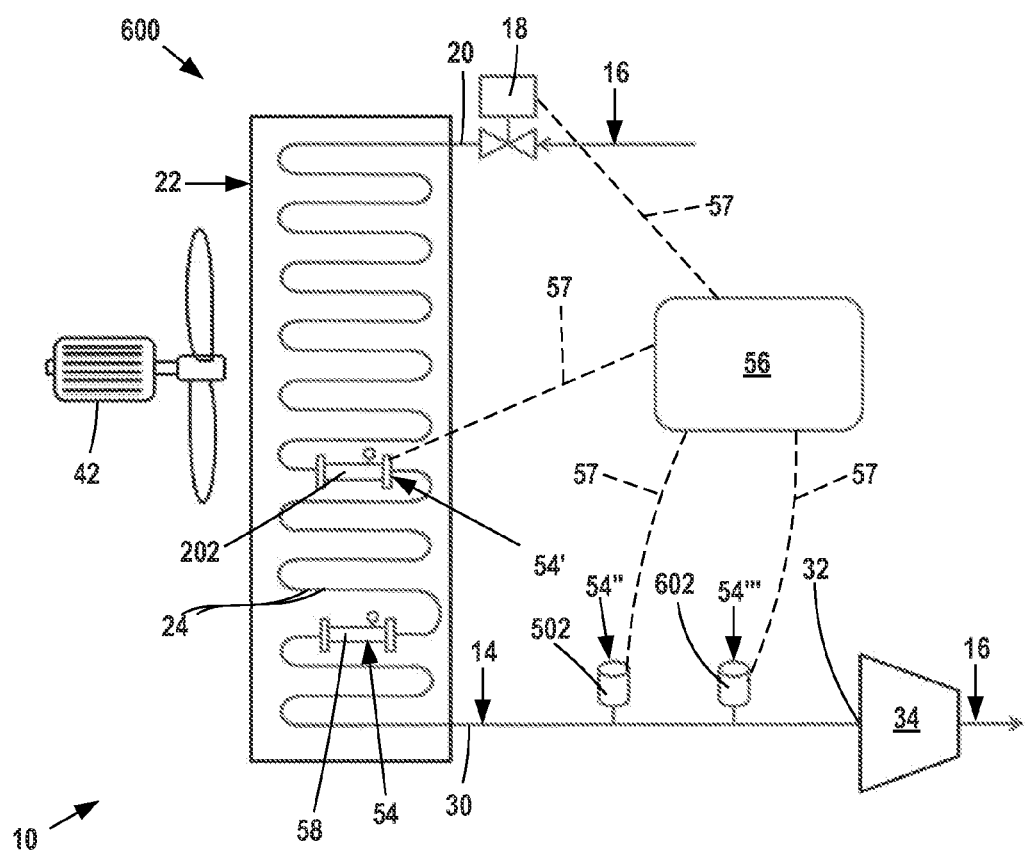
FIG. 13 is a view of the control system within an alternate embodiment refrigeration circuit low side.

FIG. 13 is a representational view of control system 10 for monitoring and controlling a refrigeration circuit 600.

Refrigeration circuit 600 is similar to refrigeration circuit 500 disclosed above but including a fourth working fluid refrigerant sensor 54''' located within evaporator output line 30 and downstream from sensor 54". As illustrated in FIG. 11, working fluid refrigerant sensor 54''' is a superheat sensor 602.

Figure 14:
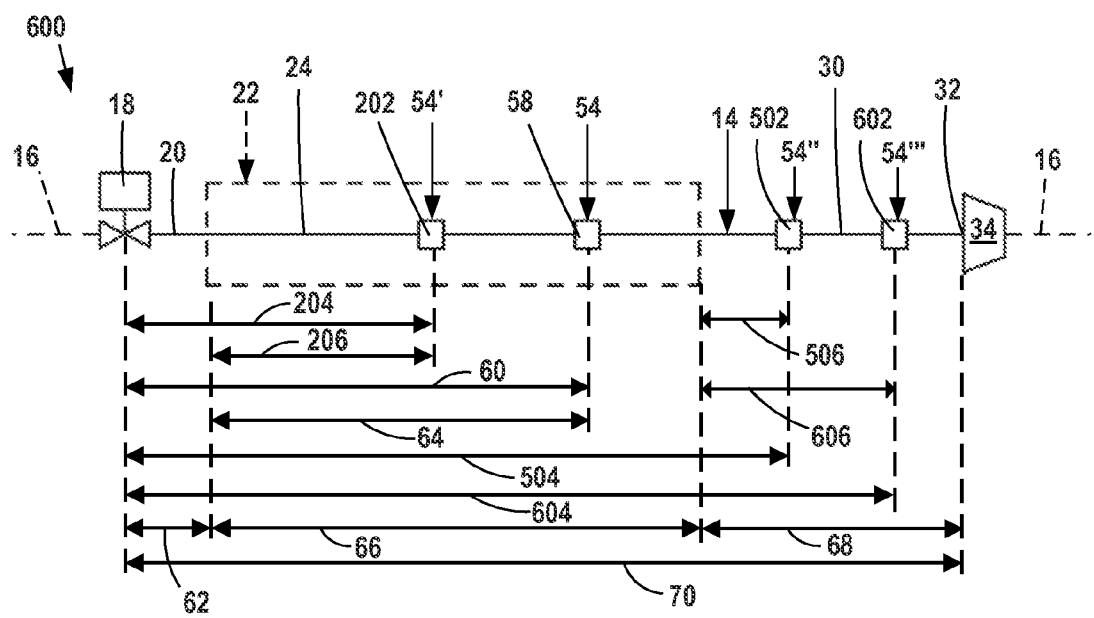
FIG. 14 is a representational view of the FIG. 13 low side line.

FIG. 14 is a representational diagram of refrigeration circuit 600 low side 14.

FIG. 14 is similar to FIG. 12 and includes superheat sensor 602 located in evaporator output line 30. Superheat sensor 602 is located in low side 14 a distance 604 from control valve 18. Distance 604 encompasses line distance 62, line distance 66 and a percentage line distance 606 of line distance 68. Distance 604 is greater than distances 204, 60 and 504.

Figure 15:
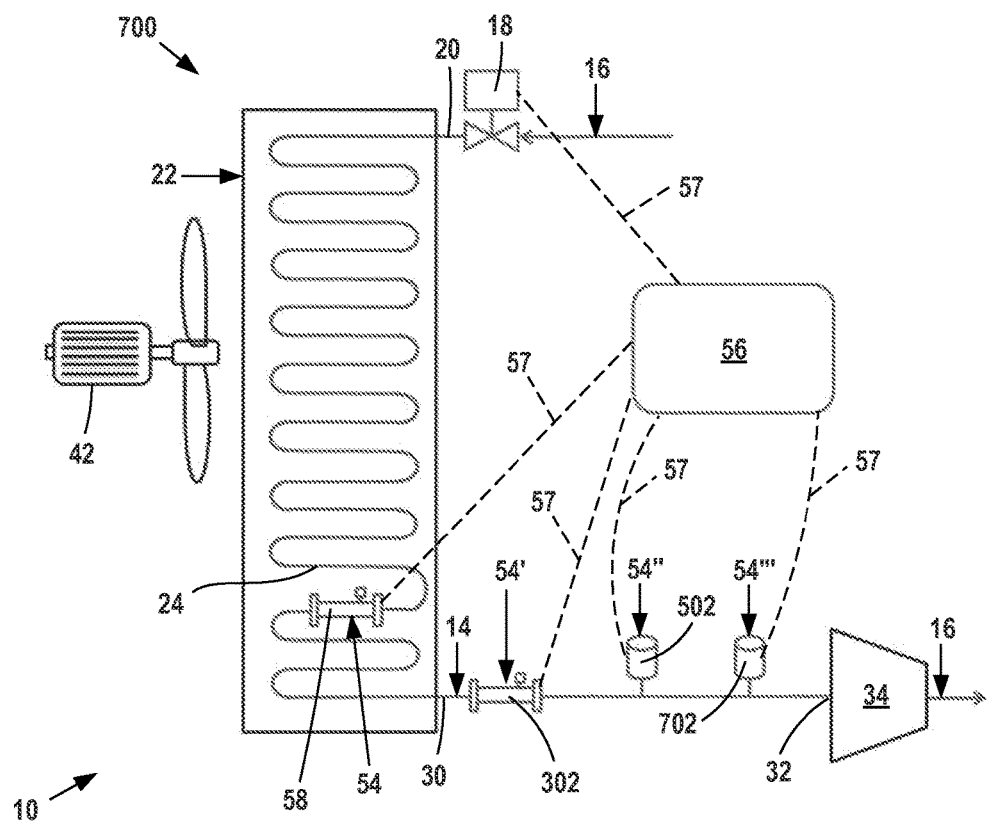
FIG. 15 is a view of the control system within an alternate embodiment refrigeration circuit low side.

FIG. 15 is a representational view of control system 10 for monitoring and controlling a refrigeration circuit 700.

Refrigeration circuit 700 is similar to refrigeration circuit 400 disclosed above but including a fourth working fluid refrigerant sensor 54''' located within evaporator output line 30 and downstream from sensor 54". As illustrated in FIG. 11, working fluid refrigerant sensor 54''' is a superheat sensor 702.

Figure 16:
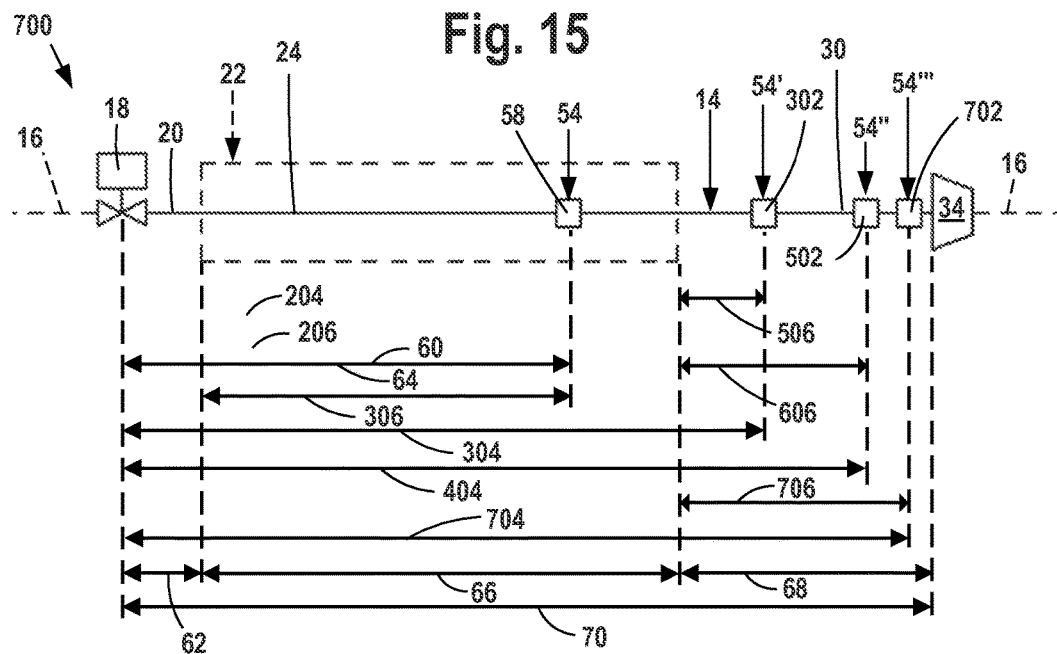
FIG. 16 is a representational view of the FIG. 15 low side line.
Figure 17:
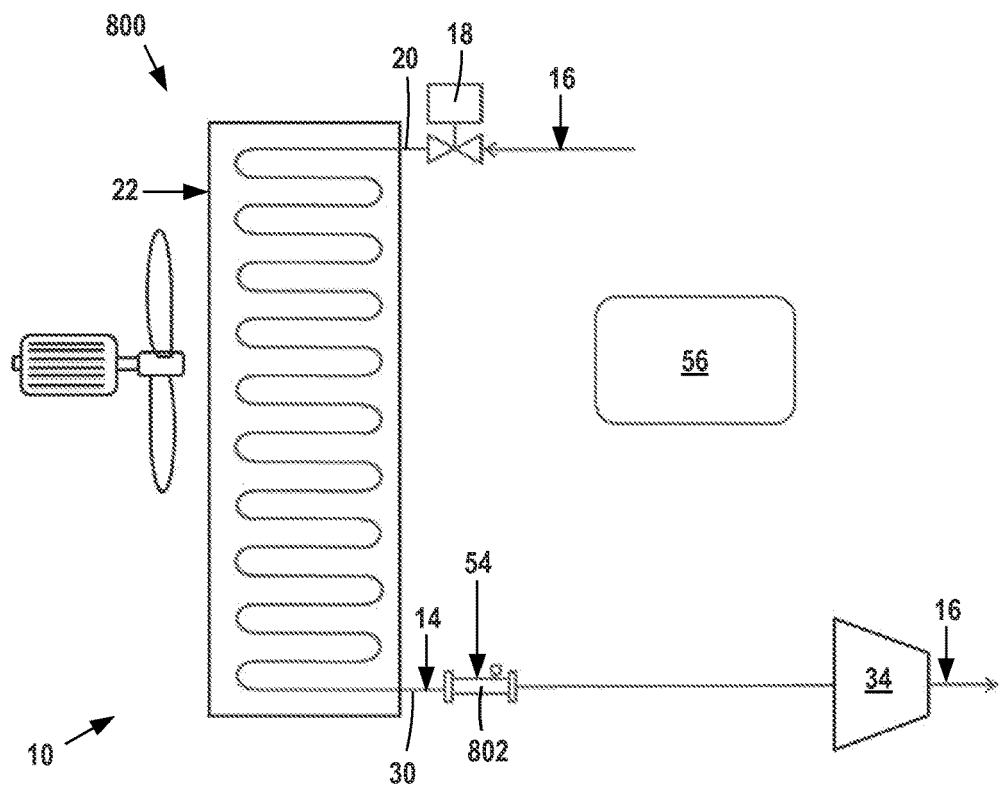
FIGS. 17 through 21 are views of the control system within the low sides of alternate embodiment refrigeration circuits.
Figure 18:
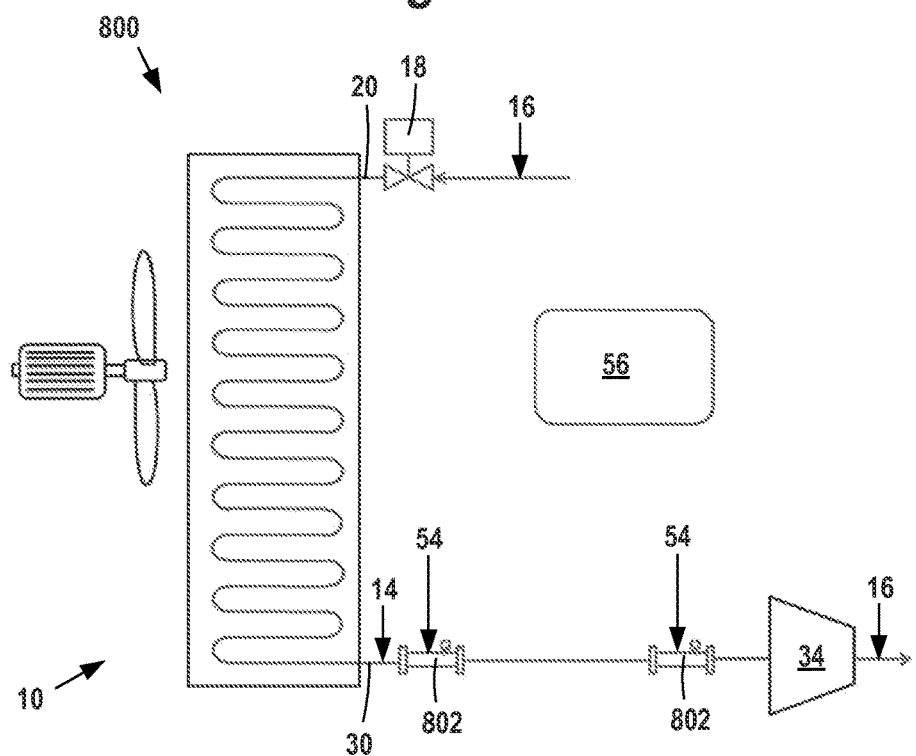
Figure 19:
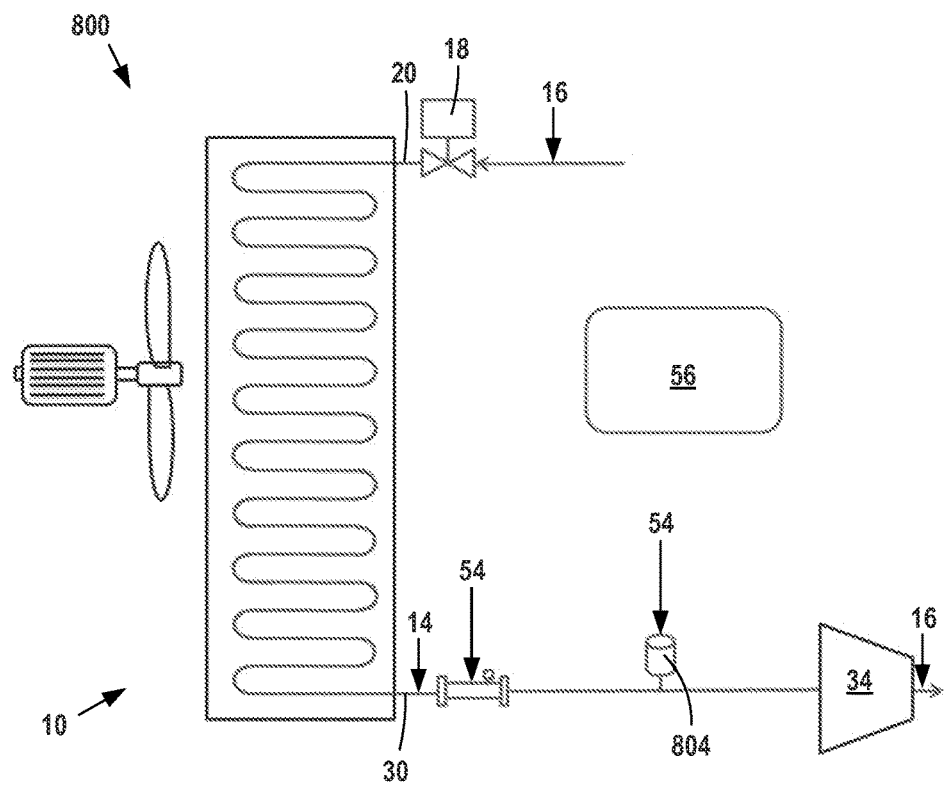
Figure 20:
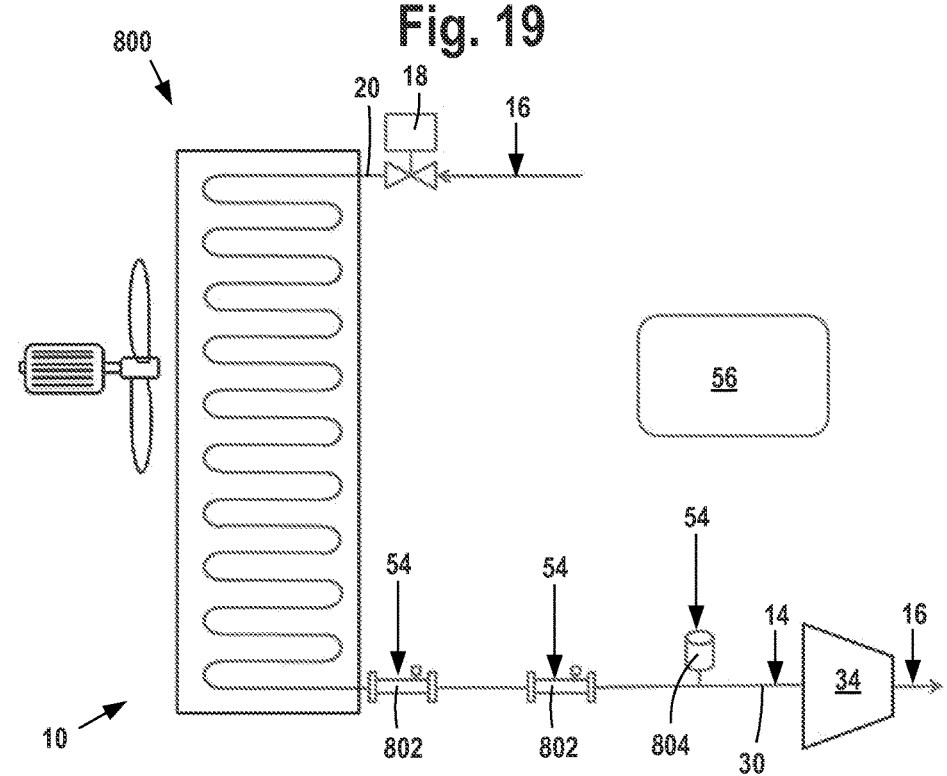
Figure 21:
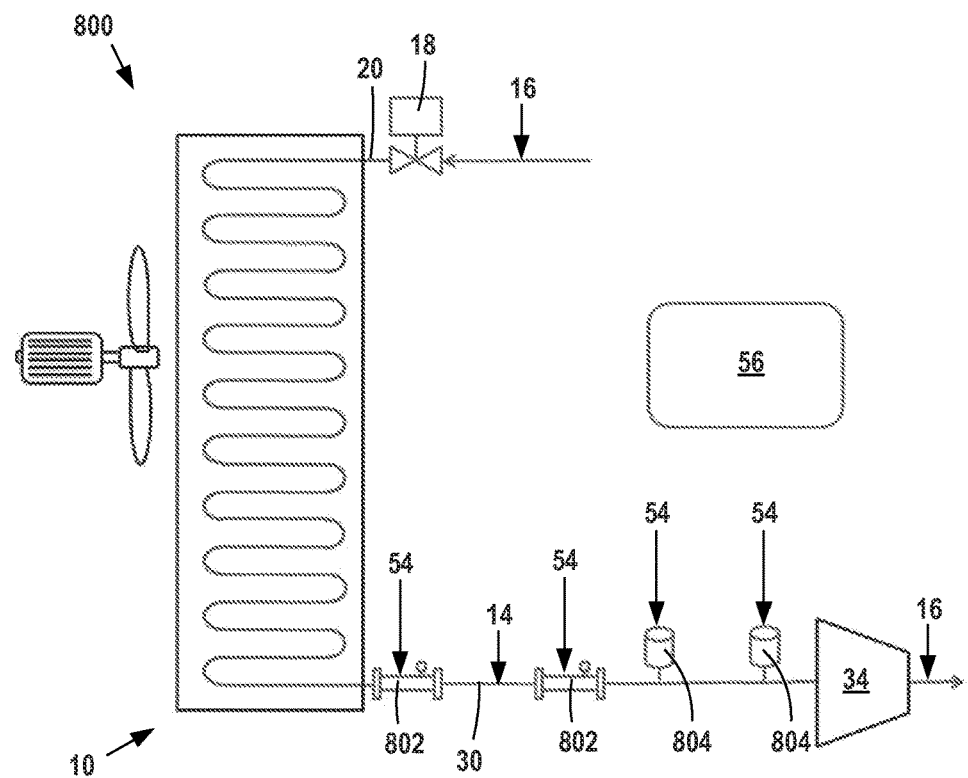

FIG. 16 is a representational diagram of refrigeration circuit 700 low side 14.

FIG. 16 is similar to FIG. 10 and includes superheat sensor 702 located in evaporator output line 30. Superheat sensor 702 is located in low side 14 a distance 704 from control valve 18. Distance 704 encompasses line distance 62, line distance 66 and a percentage line distance 706 of line distance 68. Distance 704 is greater than distances 60, 304 and 404.

Control system 10 may be used to monitor and control refrigeration circuits having one or more void fraction sensors installed within evaporator 22 along evaporator line 24 with optional additional working fluid refrigerant sensors installed within evaporator output line 30 as illustrated in FIGS. 1 through 16. In other embodiments, the control system may be used to monitor and control various refrigeration circuits 800 having one or more fluid refrigerant sensors 54 all located downstream of evaporator 22 within evaporator output line 30 as shown in FIGS. 17 through 21. Refrigeration circuits 800 fluid refrigerant sensors 54 may be void fraction sensors 802 or superheat sensors 804.

While various refrigeration circuit having refrigerant sensors installed along various locations in circuit low sides are disclosed herein, it is understood that system 10 may be used with like refrigeration circuits having one or more refrigerant sensors installed in other circuit locations and configurations as well in refrigeration circuits having multiple evaporators 22.

Figure 22:
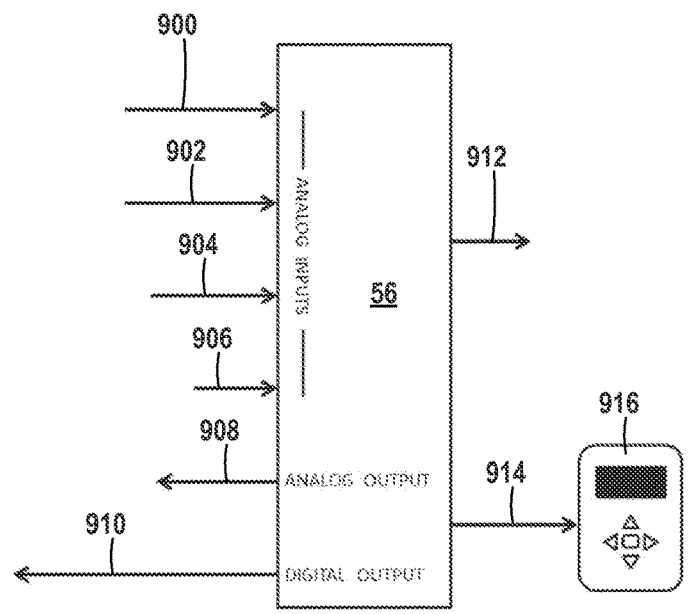
FIG. 22 is view of the control system microprocessor controller.

FIG. 22 is a representational diagram showing inputs and outputs for controller 56. Inputs 900, 902, 904 and 906 may be analog inputs for receiving sensor information from void fraction or superheat sensors. Output 908 may provide analog output control signals to control valve 18. An output 910 may provide an activation or de-activation signal to fans 42 and 48 when the refrigeration circuits is activated or de-activated. Input/output 912 may allow controller 56 to transmit refrigeration circuit sensor information to a remote computer station by wired or wireless Ethernet signals and/or receive or the like. Likewise, Input/output 912 may allow control of the circuit by a remote computer station. Similarly, input/output 914 may be used with a remote interface controller 916 for circuit control.

Operation of control system 10 to control refrigeration circuit operation will now be explained.

During refrigeration circuit operation, working fluid refrigerant flows downstream through low side 14 from valve 18 to compressor 34. Refrigerant then continues through high side 16 compressor 34 and condenser 38 and back to valve 18.

Refrigerant enters low side 14 from valve 18 in a liquid state having low-heat energy.

Refrigerant then passes through well-insulated, conventionally short evaporator input line 20 to evaporator 22. As refrigerant flows through evaporator 22, it begins to absorb heat energy from the ambient environment at a heat transfer coefficient governed by the efficiently of evaporator 22.

In refrigeration circuits, evaporators maximize cooling potential by allowing flowing refrigerant to absorb heat energy along their entire length. Efficient circuits having an evaporator line 24 of line distance 66, allow sufficient heat to be transferred to flowing refrigerant along distance to fully convert liquid refrigerant to a saturated liquid/vapor state of zero super heat. In such efficient circuits, refrigerant absorbs required heat energy at a rate proportional to the distance that a refrigerant has traveled through evaporator line 24. For example, when refrigerant has traveled a percentage distance 64 of 50% of distance 66, it has absorbed half the needed energy to fully convert to a saturated liquid/vapor state and is in a 50% vapor state. When refrigerant has traveled a percentage distance 64 of 80% of distance 66, it has absorbed 80% of the needed energy to fully convert to a saturated liquid/vapor state and is in a 50% vapor state, and so forth.

As refrigerant flows from evaporator 22 through evaporator output line 30, the saturated liquid/vapor refrigerant continues to absorb heat energy from the ambient environment at a heat transfer coefficient governed by the qualities of line 30. In efficient circuits, output lines are configured to allow flowing refrigerant to absorb sufficient heat so that the refrigerant reaches a desired degree of superheat before reaching compressor 34. Again, in such efficient circuits, refrigerant absorbs required heat energy at a rate proportional to the line distance 68 that refrigerant travels through evaporator line 30. For example, when refrigerant has traveled a percentage line distance 106 that is of 50% of distance 68, it has absorbed half the needed energy to reach a desired degree of superheat, and so forth.

Refrigerant then flows from evaporator output line 30 to compressor 34 having absorbed sufficient heat energy to reach a desired degree of superheat.

Control system 10 places one or more working fluid refrigerant sensors 54 along low side 14 total line distance 70. Control system controller 56 collects data from sensors indicative of heat energy absorbed by refrigerant at installed locations of refrigerant sensors 54. The control system compares actual operating refrigerant heat energy data collected by sensors 54 and to expected refrigerant heat energy data for an ideally operating refrigeration circuit. The expected refrigerant heat energy data may be implemented by controller 56 as assigned sensor set points for each system sensor 54.

If the actual operating and expected refrigerant heat energy data do not match, the control system actuates valve 18. In cases that the actual operating heat energy data is too low and less than an assigned sensor set point, as indicated by refrigerant in a saturated liquid/vapor state being in an unacceptably high percentage of vapor state along line distance 66 or by vapor state refrigerant having too low a degree of superheat along line distance 68, valve 18 is closed to restrict refrigerant flow into low side 14. In cases that the actual operating heat energy data is too high and greater than an assigned sensor set point, as indicated by refrigerant in a saturated liquid/vapor state being in an unacceptably low percentage of vapor state along line distance 66 or by vapor state refrigerant having too high a degree of superheat along line distance 68, valve 18 is opened to allow more refrigerant to flow into low side 14.

For instance, in the refrigeration circuit illustrated in FIG. 2 control system controller 56 collects data from a refrigerant sensor 54. In this embodiment, sensor 54 is a void-fraction sensor 58 located in evaporator line 24 and providing refrigerant liquid/vapor state data to controller 56. Controller 56 compares refrigerant operating heat energy data to data reflecting the expected amount of heat energy absorbed by the refrigerant under ideal operating conditions. The expected refrigerant heat energy data or assigned sensor set point for sensor 54 is calculated by the system controller based on the location of void-fraction sensor 58 along evaporator line 24, as indicated by sensor 58 distance 60 downstream from control valve 18. As distance 60 is increased, expected amount of heat energy absorbed by the refrigerant under ideal operating conditions likewise increases so that controller 56 adjusts the assigned sensor set point for sensor 54 accordingly.

In refrigeration circuits having more than one refrigerant sensor 54, controller 56 collects multiple sets of actual operating refrigerant heat energy data at multiple points along low side 14 total line distance 70. For instance, in the refrigeration circuit illustrated in FIG. 4, one refrigerant sensor 54 is placed in evaporator line 24 an one refrigerant sensor 54' is placed in evaporator outlet line 30. Refrigerant sensor 54 is a void-fraction sensor 58 as described immediately above. Refrigerant sensor 54' is a superheat sensor 102 providing refrigerant superheat degree data to controller 56. Controller 56 compares refrigerant operating heat energy data to data reflecting the expected amount of heat energy absorbed by the refrigerant under ideal operating conditions at both sensors. The expected refrigerant heat energy data and assigned sensor set points for each sensor is calculated by system controller 56 based on the location of void-fraction sensor 58 along evaporator line 24 and the location of superheat sensor 102 along evaporator output line 30. As each sensor's distance 60 and 104 is increased, the expected amount of heat energy absorbed by the refrigerant under ideal operating conditions likewise increases so that controller 56 adjusts the assigned sensor set point for each sensor accordingly.

In refrigeration circuits having refrigerant sensors 54 within evaporator 22 (normally void fraction sensors), system controller 56 calculates each sensor 54 ideal expected refrigerant heat energy data based on sensors' location along evaporator line 24 and downstream from valve 18.

In refrigeration circuits having refrigerant sensors 54 within evaporator outlet line 30 (normally superheat sensors, but potentially void fraction sensors in systems configured to not provide enough heat energy to refrigerant in a mixed liquid/vapor state to obtain superheat) system controller 56 calculates each sensor 54 ideal expected refrigerant heat energy data based on sensors' location along evaporator outlet line 30 and downstream from evaporator 22.

In system embodiments, controller 56 may collect multiple sets of actual operating refrigerant heat energy data from multiple refrigerant sensors 54 distributed in various locations along low side 14 as shown in the attached figures.

In the above described embodiments, control system 10 controller 56 assigns set point values representative of heat energy data along low side 14.

In system embodiments having two or more refrigerant sensors 54, controller 56 may adjust sensor set points for improved control of refrigeration circuit. In such embodiments, when a first sensor 54' located downstream of a second sensor 54" detects an undesired refrigerant heat energy state, the first sensor provides a feedback signal containing the actual operating heat energy data to controller 56. Controller 56 responds by actuating control valve 18 appropriately and by adjusting the set point of the upstream second sensor 54" to an appropriate level to obtain desired refrigerant heat energy state at the downstream first sensor 54'. Sensor set point levels are set in accordance with ideal expected refrigerant heat energy levels as refrigerant flows along low side 14. Controller 56 may adjust sensor set points though use of a proportional-integral-derivative controller.

Referring to in refrigeration circuit 100 shown in Figure and flow chart 918 shown in FIG. 23, controller steps including adjusting sensor set points is described in greater detail below.

Controller 56 operation starts at activation step 920. Controller 56 receives data from void fraction sensor 58 indicative of refrigerant heat energy content at the sensor's location in line 24 at flow chart step 922. Controller 56 receives data from superheat sensor 102 indicative of refrigerant heat energy content at the sensor's location in line 30 at flow chart step 924. At flow chart step 926, controller 56 then compares superheat sensor 102 data to a goal set point value, indicative of ideal expected refrigerant heat energy levels for sensor 102 based on its location in low side 14 based on line distance 104 downstream from valve 18.

At step 928 if superheat sensor 102 data is unacceptable, controller 56 activates its proportional-integral-derivative controller and adjusts the set point of void fraction sensor upward or downward to a corrective set-point value depending on system conditions at steps 930 and 932. The system then proceeds to step 934. At step 928 if superheat sensor 102 data is acceptable, the system then proceeds to step 934.

At step 934, controller 56 compares void fraction sensor data to the goal set point ideal value indicative of expected refrigerant heat energy levels for sensor 58 based on its location in low side 14 based on line distance 60 downstream from valve 18.

At step 936, if void fraction sensor 58 data is equal to ideal expected refrigerant heat energy levels for sensor 58, the system returns to step 922 to repeat the control loop feedback cycle. At step 936, if void fraction sensor 58 data is not equal to a set point ideal expected refrigerant heat energy level for sensor 58, the controller proceeds to step 938.

At step 938, if void fraction sensor 58 data indicates that refrigerant heat energy levels are greater than the set point heat energy level for sensor 58, controller 56 activates its proportional-integral-derivative controller at step 940 and actuates control valve 18 open at step 942 to flow additional refrigerant into low side 14. The system then returns to step 922 to repeat the control loop feedback cycle.

Alternatively at step 938, if void fraction sensor 58 data indicates that refrigerant heat energy levels are lower than the set point heat energy level for sensor 58, controller activates its proportional-integral-derivative controller at step 944 and actuates control valve 18 closed at step 946 to flow less refrigerant into low side 14. The system then returns to step 922 to repeat the control loop feedback cycle.

Figure 23:
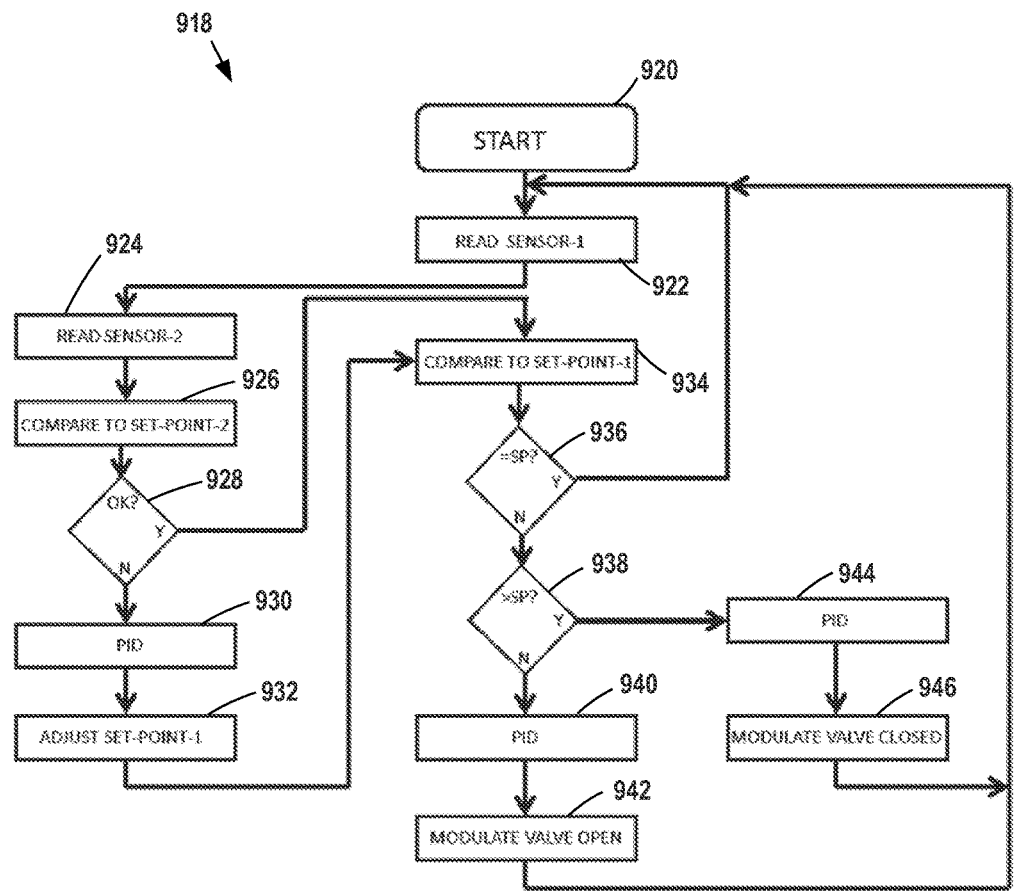
FIG. 23 is a flow chart illustrating showing example steps executed by the control system during operation.

It is understood that the example illustrated by FIG. 23 flow chart 918 may be used with the refrigeration circuits having more than two fluid sensors 54 as disclosed herein. In these refrigeration circuits, controller 56 may likewise adjust the set points of more than one working fluid refrigerant sensor located upstream of a downstream fluid sensor 54 based on the downstream fluid sensor's detected refrigerant heat energy levels.

In these embodiments, control system 10 embodiments may allow the proportional-integral-derivative controller in controller 56 to simultaneously adjust the set points of multiple sensors 54 in response to variable cooling load conditions a predictive manner.

As indicated above, at system 10 activation, the controller 56 assigns each sensor 54 an initial goal set point value based on the expected refrigerant heat energy along low side line 14. The most downstream refrigerant sensor 54 in low side line 14 is assigned a goal set point corresponding to a desired ideal refrigerant heat energy value.

For instance, in refrigeration circuit 700 shown in FIG. 15, the ideal refrigerant heat energy value for the most downstream refrigerant sensor 54''' superheat sensor 702 in low side line 14 is a superheat degree of certain value.

If the desired ideal refrigerant heat energy value is not detected by superheat sensor 702, controller 56 may assign new corrective set-point values to each refrigerant sensor 54, 54' and 54" located upstream of refrigerant sensor 54''' simultaneously. The corrective set-point values are set at values appropriate to allow system 10 to meter refrigerant flow appropriately at valve 18 obtain the desired ideal refrigerant heat energy value at refrigerant sensor 54''' as indicated by the sensor 54''' goal set point.

As variable cooling load conditions continue and the heat energy value of refrigerant flowing downstream through low side line 14 changes, a refrigerant sensor 54 will detect undesired actual energy values in conflict with the corrective set-point values. In response, system controller 56 will assign upstream sensors 54 new corrective set-point values to allow system 10 to meter refrigerant flow appropriately at valve 18 and obtain the desired ideal refrigerant heat energy value at the downstream sensor 54.

While this disclosure focuses on control systems for vapor-compression refrigeration circuits using ammonia as a working fluid, in other possible embodiments the control system may be used for various vapor-compression refrigeration circuits having an evaporator and compressor and/or other working fluid refrigerants.

It is understood that the one or more embodiments disclosed herein are capable of modification, and that this disclosure is therefore not limited to the precise details set forth, but extends to such changes and alterations as fall within the purview of the following claims.

The invention claimed is:

1. A control system for a refrigeration circuit comprising a low side line having an evaporator and a high side line having a compressor and the low side line extending a low side line distance from an upstream control valve to a downstream compressor inlet;
   the low side line distance comprising an evaporator line having an evaporator line distance extending downstream through the evaporator from an evaporator inlet to an evaporator outlet and an evaporator outlet line distance extending from the evaporator outlet to a downstream compressor inlet;
   the low side line having a heat transfer coefficient proportional to the low side line distance, the heat transfer coefficient of the low side line comprising an evaporator line heat transfer coefficient corresponding to the evaporator line distance and an evaporator outlet line heat transfer capacity corresponding to the evaporator outlet line distance;
   a source providing heat energy to the low side line;
   a working fluid refrigerant in the refrigeration circuit and extending through the low side line, the working fluid refrigerant flowing downstream through the low side line from the upstream control valve to the downstream compressor inlet, the working fluid refrigerant flowing at a flow rate metered by the upstream control valve, the working fluid refrigerant having an expected heat energy value and the working fluid refrigerant having an actual heat energy value;
   a first working fluid refrigerant sensor in the low side line, the first working fluid refrigerant sensor at a first sensor distance, the first sensor distance located downstream from the upstream control valve;
   a second working fluid refrigerant sensor in the low side line, the second working fluid refrigerant sensor at a second sensor distance, the second sensor distance located downstream from the upstream control valve and downstream from the first working fluid refrigerant sensor, the second sensor distance is greater than the first sensor distance;
   the first working fluid refrigerant sensor detecting the actual heating energy value of the working fluid refrigerant at the first sensor distance and the second refrigerant sensor detecting the actual heat energy value of the working fluid refrigerant at the second sensor distance;
   a programmable controller in communication with the first and second working fluid refrigerant sensors and the upstream control valve, the programmable controller receiving working fluid refrigerant actual heat energy data from the first and second working fluid refrigerant sensors, the programmable controller programed with a first assigned goal set point value corresponding to the expected energy value of the working fluid refrigerant at the first sensor distance and a second assigned goal set point value corresponding to the expected energy value of the working fluid refrigerant at the second sensor distance, wherein if the actual energy value of the working fluid detected by the second working fluid refrigerant sensor at the second sensor distance is different from the second assigned goal set point value, the programmable controller changes the first assigned goal set point value to a corrective set point value and if the actual energy value of the working fluid refrigerant detected by the first working fluid refrigerant sensor data at the first sensor distance is different from the corrective set point value, the programmable controller actuates the control valve to increase or decrease the flow of the working fluid refrigerant through the low side line to achieve the desired energy value of the working fluid refrigerant at the second sensor distance.

2. The control system of claim 1 wherein the first working fluid refrigerant sensor is a first void fraction sensor located in the evaporator line.

3. The control system of claim 2 wherein the second working fluid refrigerant sensor is a second void fraction sensor located in the evaporator line.

4. The control system of claim 2 wherein the second working fluid refrigerant sensor is a superheat sensor located in the evaporator outlet line.

5. The control system of claim 1 comprising a third working fluid refrigerant sensor in the low side line, the third working fluid refrigerant sensor at a third sensor distance, the third sensor distance located downstream from the upstream control valve and downstream from the second working fluid refrigerant sensor, the third working fluid refrigerant sensor detecting the working fluid refrigerant actual heat energy value at the third sensor distance, the programmable controller in communication with the third working fluid refrigerant sensor, the programmable controller receiving the actual heat energy value of working fluid refrigerant from the third working fluid refrigerant sensor, the programmable controller programed with a third assigned goal set point value corresponding to the expected energy value of refrigerant at the third sensor distance, wherein if the working fluid refrigerant actual heat energy value at the third sensor distance is different from the third assigned goal set point value, the programmable controller changes the first assigned goal set point value or the second assigned goal set point value to the corrective set point value.

6. The control system of claim 5 wherein the third working fluid refrigerant sensor is a superheat sensor located in the evaporator outlet line.

7. A method of regulating a refrigeration circuit comprising the steps of:
   A. Providing a refrigeration circuit comprising a low side line having a low side line distance extending from an upstream control valve to a downstream compressor inlet, the low side line comprising an evaporator and an evaporator outlet line, the low side line further comprising a heat transfer coefficient proportional to the low side line distance;

B. Providing a working fluid refrigerant to the refrigeration circuit to the low side line through the upstream control valve;

C. Providing a heat energy source;

D. Flowing the working fluid refrigerant downstream through the evaporator line an evaporator line distance;

E. Flowing heat energy from the heat energy source to the working fluid refrigerant in the evaporator line at an amount corresponding to an evaporator line heat transfer coefficient and the evaporator line distance;

P. Providing a first working fluid refrigerant sensor in the low side line, the first working fluid refrigerant sensor at a first sensor distance, the first sensor distance located downstream from the upstream control valve;

G. Assigning a first set point value at the first sensor distance corresponding to the expected energy value of the working fluid refrigerant at the first sensor distance;

H. Providing a second working fluid refrigerant sensor located in the low side line, the second working fluid refrigerant sensor at a second sensor distance, the second sensor distance located downstream from the upstream control valve and downstream from the first working fluid refrigerant sensor;

I. Assigning a second set point value at the second sensor distance corresponding to the expected energy value of the working fluid refrigerant at the second sensor distance;

J. Detecting an actual heat energy value at the second sensor distance;

K. Comparing the actual heat energy value detected by the second working fluid refrigerant sensor at the second sensor distance to the second set point value;

L. Changing the first set point value to a corrective set point value if the actual heat energy value detected by the second working fluid refrigerant sensor at the second sensor distance is different to the second set point value; and M. Actuating the upstream control valve to increase or decrease the flow of working fluid refrigerant through the low side line.

8. The method of claim 7 comprising the step of:

N. Repeating steps J through L until the actual heat energy value detected by the second working fluid refrigerant sensor at the second sensor distance corresponds to the second set point value.

9. The method of claim 7 wherein the first and second working fluid refrigerant sensors are void-fraction sensors located in the evaporator.

10. The method of claim 7 wherein the first working fluid refrigerant sensor is a void-fraction sensor located in the evaporator and the second working fluid refrigerant sensor is a superheat sensor located in the evaporator outlet line.

11. The method of claim 7 wherein the first and second working fluid refrigerant sensors are superheat sensors located in the evaporator outlet line.

12. The method of claim 7 wherein step K comprises detecting an actual heat energy value at the second sensor distance higher than the expected working fluid refrigerant heat energy value corresponding to the second set point value, step L comprises changing the first set point value to a corrective set point value corresponding to a lower expected energy value than the first set point value and step M comprises actuating the upstream control valve to increase the flow of working fluid refrigerant through the low side line.

13. The method of claim 7 wherein step K comprises detecting an actual heat energy value at the second sensor distance lower than the expected energy value corresponding to the second set point value, step L comprises changing the first set point value to a corrective set point value corresponding to a higher expected energy value than the first set point value and step M comprises actuating the upstream control valve to decrease the flow of working fluid refrigerant through the low side line.

14. The method of claim 7 comprising the steps of:

O. Providing a third working fluid refrigerant sensor located in the low side line, the third working fluid refrigerant sensor at a third sensor distance, the third sensor distance located downstream from the upstream control valve and downstream from the second working fluid refrigerant sensor;

P. Assigning a third set point value at the third sensor distance corresponding to the expected energy value of the working fluid refrigerant at the third sensor distance;

Q. Detecting an actual heat energy value at the third sensor distance;

R. Comparing the actual heat energy value at the third sensor distance to the third set point value;

S. Changing either:

the first set point value to the corrective set point value if the actual heat energy value detected by the third working fluid refrigerant sensor at the third sensor distance is different to the third set point value;

or the second set point value to the corrective set point value if the actual heat energy value detected by the third working fluid refrigerant sensor at the third sensor distance is different to the third set point value; and T. Actuating the control valve to increase or decrease the flow of working fluid refrigerant through the low side line.

15. The method of claim 14 comprising the step of:

U. Repeating steps Q through T until the actual heat energy value detected by the third working fluid refrigerant sensor at the third sensor distance corresponds to the third set point value.

16. The method of claim 15 wherein the third working fluid refrigerant sensor is a void-fraction sensor located in the evaporator.

17. The method of claim 15 wherein the third working fluid refrigerant sensor is a superheat sensor located in the evaporator outlet line.

18. The method of claim 15 wherein step R comprises detecting the actual heat energy value by the third working fluid refrigerant sensor at the third sensor distance higher than the expected energy value corresponding to the third set point value, step S comprises changing either:

the first set point value to the corrective set point value corresponding to the expected energy value lower than the first set point value;

or the second set point value to the corrective set point value corresponding to the expected energy value lower than the second set point value;

and step T comprises actuating the control valve to increase the flow of working fluid refrigerant through the low side line.

19. The method of claim 15 wherein step R comprises detecting the actual heat energy value at the third sensor distance is lower than the expected energy value corresponding to the third set point value, step S comprises changing either:
- the first set point value to the corrective set point value corresponding to the expected energy value higher than the first set point value;
or
- the second set point value to the corrective set point value corresponding to the expected energy value higher than the second set point value;
- and step T comprises actuating the upstream control valve to decrease the flow of working fluid refrigerant through the low side line.

20. A method of regulating a refrigeration circuit having a low side line extending from an upstream control valve to a downstream compressor inlet, the low side line having an evaporator and an evaporator outlet line and a working fluid refrigerant therein, the working fluid refrigerant flowing downstream through the evaporator line from the control valve and through the evaporator and evaporator outlet line to the compressor inlet, the method comprising the steps of:
- A. Flowing heat energy from a heat energy source outside the refrigeration circuit to the working fluid refrigerant;
- B. Providing an first working fluid refrigerant sensor located in the low side line a first sensor distance downstream from the control valve;
- C. Assigning a first set point value at the first sensor distance corresponding to an expected energy value of the working fluid refrigerant at the first sensor distance;
- D. Providing a second working fluid refrigerant sensor located in the low side line a second sensor distance downstream from the control valve and downstream from the first working fluid refrigerant sensor;
- E. Assigning a second set point value at the second sensor distance corresponding to the expected energy value of the working fluid refrigerant at the second sensor distance;
- F. Detecting an actual heat energy value by the second working fluid refrigerant sensor at the second sensor distance;
- G. Comparing the actual heat energy value detected by the second working fluid refrigerant sensor at the second sensor distance to the second set point value;
- H. Changing the first set point value to a corrective set point value if the actual heat energy value detected by the second working fluid refrigerant sensor at the second sensor distance is different to the second set point value and actuating the control valve to increase or decrease the flow of working fluid refrigerant through the low side line.

21. The method of claim 20 comprising the step of:
- I. Repeating steps F through H until the actual heat energy value detected by the second working fluid refrigerant sensor at the second sensor distance corresponds to the second set point value.

22. The method of claim 20 wherein the first working fluid refrigerant sensor is a void-fraction sensor located in the evaporator.

23. The method of claim 20 wherein the second working fluid refrigerant sensor is a void-fraction sensor located in the evaporator.

24. The method of claim 20 wherein the first and second working fluid refrigerant sensors are superheat sensors located in the evaporator outlet line.

* * * * *

UNITED STATES PATENT AND TRADEMARK OFFICE
CERTIFICATE OF CORRECTION

| | | |
|---|---|---|
| PATENT NO. | : 10,047,990 B2 | Page 1 of 1 |
| APPLICATION NO. | : 14/776977 | |
| DATED | : August 14, 2018 | |
| INVENTOR(S) | : Marshall et al. | |

It is certified that error appears in the above-identified patent and that said Letters Patent is hereby corrected as shown below:

In the Claims

Claim 1, Column 14, Line 23 delete "data";
Claim 7, Column 15, Line 16 replace "P." with --F.--;
Claim 7, Column 15, Line 24 delete "located".

Signed and Sealed this
Eleventh Day of December, 2018

Andrei Iancu
*Director of the United States Patent and Trademark Office*

UNITED STATES PATENT AND TRADEMARK OFFICE
CERTIFICATE OF CORRECTION

PATENT NO. : 10,047,990 B2
APPLICATION NO. : 14/776977
DATED : August 14, 2018
INVENTOR(S) : Marshall et al.

Page 1 of 1

It is certified that error appears in the above-identified patent and that said Letters Patent is hereby corrected as shown below:

In the Claims

Claim 7, Column 15, Line 2 insert after "line," --the evaporator comprising an evaporator line extending from an evaporator inlet to an evaporator outlet--.

Signed and Sealed this
Seventeenth Day of March, 2020

Andrei Iancu
*Director of the United States Patent and Trademark Office*